(12) United States Patent
Anttila et al.

(10) Patent No.: US 7,623,824 B2
(45) Date of Patent: Nov. 24, 2009

(54) BROADCAST MEDIA BOOKMARKS

(75) Inventors: Akseli Anttila, Helsinki (FI); Mikko Mäkipää, Helsinki (FI); Jörgen Othman, Espoo (FI)

(73) Assignee: Nokia Corporation, Espoo (FI)

( * ) Notice: Subject to any disclaimer, the term of this patent is extended or adjusted under 35 U.S.C. 154(b) by 419 days.

(21) Appl. No.: 10/319,475

(22) Filed: Dec. 16, 2002

(65) Prior Publication Data

US 2004/0198279 A1 Oct. 7, 2004

(51) Int. Cl.
*H04H 7/00* (2006.01)

(52) U.S. Cl. .................. 455/3.06; 455/456.3; 455/3.02

(58) Field of Classification Search .............. 455/414.1, 455/422.1, 426.1, 448, 454, 456.1, 456.3, 455/456.6, 457, 3.02, 550.1, 566, 455, 517, 455/556; 709/203, 206, 217, 218, 219, 228; 707/104.1, 10; 348/14.02, 14.016
See application file for complete search history.

(56) References Cited

U.S. PATENT DOCUMENTS

| | | | |
|---|---|---|---|
| 5,128,981 A | | 7/1992 | Tsukamoto et al. |
| 5,852,610 A | * | 12/1998 | Olaniyan .................... 370/486 |
| 5,907,322 A | | 5/1999 | Kelly et al. |
| 6,035,202 A | * | 3/2000 | Camp, Jr. ................. 455/456.1 |
| 6,097,441 A | * | 8/2000 | Allport ........................ 348/552 |
| 6,182,113 B1 | * | 1/2001 | Narayanaswami .......... 709/203 |
| 6,314,094 B1 | | 11/2001 | Boys |
| 8,341,133 | | 2/2002 | Kawamoto et al. |
| 6,507,727 B1 | | 1/2003 | Henrick |
| 6,560,640 B2 | * | 5/2003 | Smethers .................... 709/219 |
| 6,578,047 B1 | * | 6/2003 | Deguchi .................. 707/104.1 |
| 6,628,928 B1 | | 9/2003 | Crosby et al. |
| 8,618,585 | | 9/2003 | Robinson |
| 6,650,877 B1 | | 11/2003 | Tarbouriech et al. |
| 6,657,989 B1 | * | 12/2003 | Hilsenrath .................. 370/351 |
| 6,674,448 B1 | * | 1/2004 | Garahi et al. ............... 715/719 |

(Continued)

FOREIGN PATENT DOCUMENTS

EP 1 022 915 A1 7/2000

(Continued)

OTHER PUBLICATIONS

"Give Me SMARTRADIO Now", printed Feb. 20, 2002, http://smartradio.mediacorpradio.com/Stations/radiostations.htm.

(Continued)

*Primary Examiner*—Sujatha Sharma
*Assistant Examiner*—Quochien B Vuong
(74) *Attorney, Agent, or Firm*—Banner & Witcoff, Ltd.

(57) ABSTRACT

A system and method is provided for permitting a mobile device to connect to a broadcast station web site and to receive a broadcast station broadcast in response to selection of a bookmark. Selection of the bookmark results in a tuner on the mobile device being tuned to receive a broadcast while the mobile device substantially simultaneously connects to a web site for the broadcast station. The bookmark may be programmed by the user and may represent different broadcast stations according to parameters. Bookmarks may be displayed to the user based on geographical location information. Bookmarks may be created by scanning for available broadcasts at a geographical location. RDS information may supplement broadcast information and may be sent to the mobile device via CBS messages.

34 Claims, 21 Drawing Sheets

U.S. PATENT DOCUMENTS

| | | |
|---|---|---|
| 6,970,915 B1 | 11/2005 | Partovi et al. |
| 2001/0043684 A1 | 11/2001 | Guedalia et al. |
| 2002/0010789 A1* | 1/2002 | Lord ............................. 709/231 |
| 2002/0016165 A1 | 2/2002 | Davies et al. |
| 2002/0068538 A1 | 6/2002 | Hitomi et al. |
| 2002/0081968 A1 | 6/2002 | Russell |
| 2002/0102954 A1 | 8/2002 | Kaneko |
| 2002/0111134 A1 | 8/2002 | Salurso et al. |
| 2002/0152267 A1* | 10/2002 | Lennon ....................... 709/203 |
| 2002/0174431 A1* | 11/2002 | Bowman et al. ............... 725/47 |
| 2003/0005433 A1* | 1/2003 | Janik et al. .................... 725/18 |
| 2003/0030749 A1 | 2/2003 | Kondo et al. |
| 2003/0040302 A1 | 2/2003 | Okada |
| 2003/0041334 A1* | 2/2003 | Lu ............................. 725/113 |
| 2003/0060157 A1* | 3/2003 | Henrick ..................... 455/3.04 |
| 2003/0061110 A1* | 3/2003 | Bodin ......................... 705/26 |
| 2003/0208762 A1 | 11/2003 | Hanai et al. |
| 2004/0049779 A1* | 3/2004 | Sjoblom et al. ............... 725/13 |
| 2004/0192302 A1 | 9/2004 | Achour et al. |
| 2005/0020223 A1* | 1/2005 | Ellis et al. ................. 455/186.1 |
| 2005/0020238 A1* | 1/2005 | Eastman et al. ............. 455/403 |
| 2005/0170799 A1 | 8/2005 | Strandberg et al. |

FOREIGN PATENT DOCUMENTS

| | | |
|---|---|---|
| EP | 1035674 A2 | 9/2000 |
| JP | 59230330 | 12/1984 |
| JP | 10145687 | 5/1998 |
| JP | 11275537 | 10/1999 |
| JP | 2000339345 | 12/2000 |
| JP | 2001264089 | 9/2001 |
| JP | 2002063104 | 2/2002 |
| JP | 2002091652 | 3/2002 |
| JP | 2002344943 | 11/2002 |
| JP | 2003224535 | 8/2003 |
| JP | 2004032650 | 1/2004 |
| KR | 20000017754 | 4/2000 |
| KR | 2002-44556 | 6/2002 |
| WO | WO 01/28260 A2 | 4/2001 |
| WO | 0135658 A1 | 5/2001 |
| WO | WO 0217117 A2 * | 2/2002 |

OTHER PUBLICATIONS

Supplementary European Search Report dated Feb. 7, 2006.
Korean Office Action dated Mar. 28, 2006.
Korean Office Action dated Sep. 26, 2006.

* cited by examiner

BROADCAST MEDIA BOOKMARKS

FIELD OF THE INVENTION

This invention relates generally to mobile devices. More particularly, the present invention relates to a device having broadcast tuning and digital communication capabilities.

BACKGROUND OF THE INVENTION

Preset radio buttons are common on conventional radios and are well known for use as programmable shortcuts to frequencies associated with favorite radio stations. Mobile devices that are capable of receiving FM radio transmissions are also known. Like conventional radios, these devices typically include options for storing frequencies associated with favorite radio stations and for quickly tuning to those frequencies. Unlike convention radios, however, many of these mobile devices are connected to data networks. As such, these mobile devices may send and receive data, and may provide access to the Internet through the device.

Because many mobile devices may simultaneously receive FM radio stations and browse the Internet, it is often desirable when listening to the radio on such a device to view the content of a web page associated with the radio station. The content of such a web page may supplement the radio broadcast with further details and information related to the broadcast, or provide additional information such as local news and weather. These mobile devices, however, do not typically include a means for accessing, in parallel, Internet media and FM broadcast media associated with a radio station.

To view web page content for a radio station while listening to the radio station broadcast on such conventional mobile devices, a user typically must tune to the radio station of interest and independently navigate the Internet to find a web site associated with the radio station. The user may navigate to the radio station web site through the use of a pre-selected bookmark for the web site, and may tune to the radio broadcast with a radio station bookmark; however, the user nonetheless independently tunes the radio and navigates the web in order to simultaneously listen to the radio station broadcast and browse the corresponding web site. The use of a preset radio button along with a web site bookmark requires the user to employ separate steps for controlling access to each media source. Such a process is time-consuming and more complex than necessary. Further, such a process is cumbersome when scanning multiple broadcasts that may be available in a certain geographical area. To address this shortcoming in such mobile devices, solutions have been proposed.

One proposed solution includes the use of digital radio services. Digital radio consists of radio broadcasts of data rather than analog transmissions. Because the data transmitted may include various types of information along with audio information, a mobile device receiving digital radio broadcasts may view content associated with the audio radio broadcast. Radio stations broadcasting digital radio, therefore, can transmit information, such as traffic, weather, and advertising information, simultaneous with the audio broadcast. Unless the mobile device is in communication with the Internet, however, the user is limited to one-way communication with the radio station. In other words, the user may be able to view information sent by the radio station, and may even be able to navigate through the information, but the user is unable to request different information or to interact with the radio station in two-way communication.

Another proposed solution includes the use of radio data system (RDS) technology. RDS technology includes the transmission of limited amounts of data along with FM radio transmissions. The data is carried inaudibly in one or more subcarrier frequencies that are part of the baseband transmission. The amount of data that can be transmitted is relatively small and typically includes information such as a program service name (PS), program identity (PI), or alternative frequencies for the station broadcast. Like digital radio, unless the mobile device is in communication with the Internet, however, the user is limited to one-way communication with the radio station. In other words, the user may be able to view a small amount of information sent by the radio station, but the user is unable to request different information or to interact with the radio station in two-way communication. Further, the use of RDS requires an additional antenna and tuner, which are not available on many such mobile devices.

For both conventional radios and mobile devices, when a user travels to a different geographical area, pre-set buttons or other programmable shortcuts to favorite radio stations are generally not applicable for the new geographical area. As such, the user typically scans through available frequencies in the new area to receive desired broadcasts and/or to reset shortcuts to desired radio stations. This process may be time consuming and frustrating for the user, particularly one who travels frequently. Further, the user may not fully appreciate characteristics of scanned broadcast stations located during the scanning process when only audio information is transmitted. For example, a user may not recognize station identity and broadcast genre for audio only stations—particularly when scanned stations are broadcasting advertisements during the scanning process.

Thus, a need exists for systems and methods that simplify broadcast media tuning on mobile devices capable of receiving analog and digital communications. Also, a need exists for systems and methods that simplify the scanning process for reception of media broadcasts. Further, a need exists for systems and methods that reduce, if not eliminate, the need for resetting station shortcuts to media broadcasts when traveling to different geographical areas. Additionally, a need exists for interacting with graphical content provided by broadcast stations while scanning for reception of broadcast signals.

SUMMARY OF THE INVENTION

In order to overcome the above-described problems and other problems that will become apparent when reading this specification, the present invention provides systems and methods for providing media broadcast tuning on mobile devices capable of receiving analog and digital communications. In one embodiment, combined functionality bookmarks are provided on a mobile device according to geographical location, which provide shortcuts to media broadcasts and associated websites. In another embodiment of the invention, broadcast station scanning/scrolling is simplified by providing a graphic representing a scanned station broadcast, which aids the user in identifying the broadcast station and characteristics of the station.

According to a further embodiment, supplemental broadcast information is provided to the mobile device by a cell broadcast service. In one aspect of the invention, the supplemental broadcast information includes bookmark information. In other aspects, the supplemental broadcast information enables automatic radio tuning features. In many embodiments of the invention, computer-executable instructions for implementing the disclosed methods are stored on computer-readable media. Additionally, embodiments may include reception of different broadcasts, such as television, satellite and other broadcasts. Other features and advantages of the invention will become apparent with reference to the following detailed description and figures.

BRIEF DESCRIPTION OF THE DRAWINGS

The invention will be described in detail in the following description of preferred embodiments with reference to the following figures wherein.

DETAILED DESCRIPTION OF THE INVENTION

In the following description of the various embodiments, reference is made to the accompanying drawings that form a part hereof, and in which is shown by way of illustration various embodiments in which the invention may be practiced. It is to be understood that other embodiments may be utilized and structural and functional modifications may be made without departing from the scope of the present invention.

Figure 1:
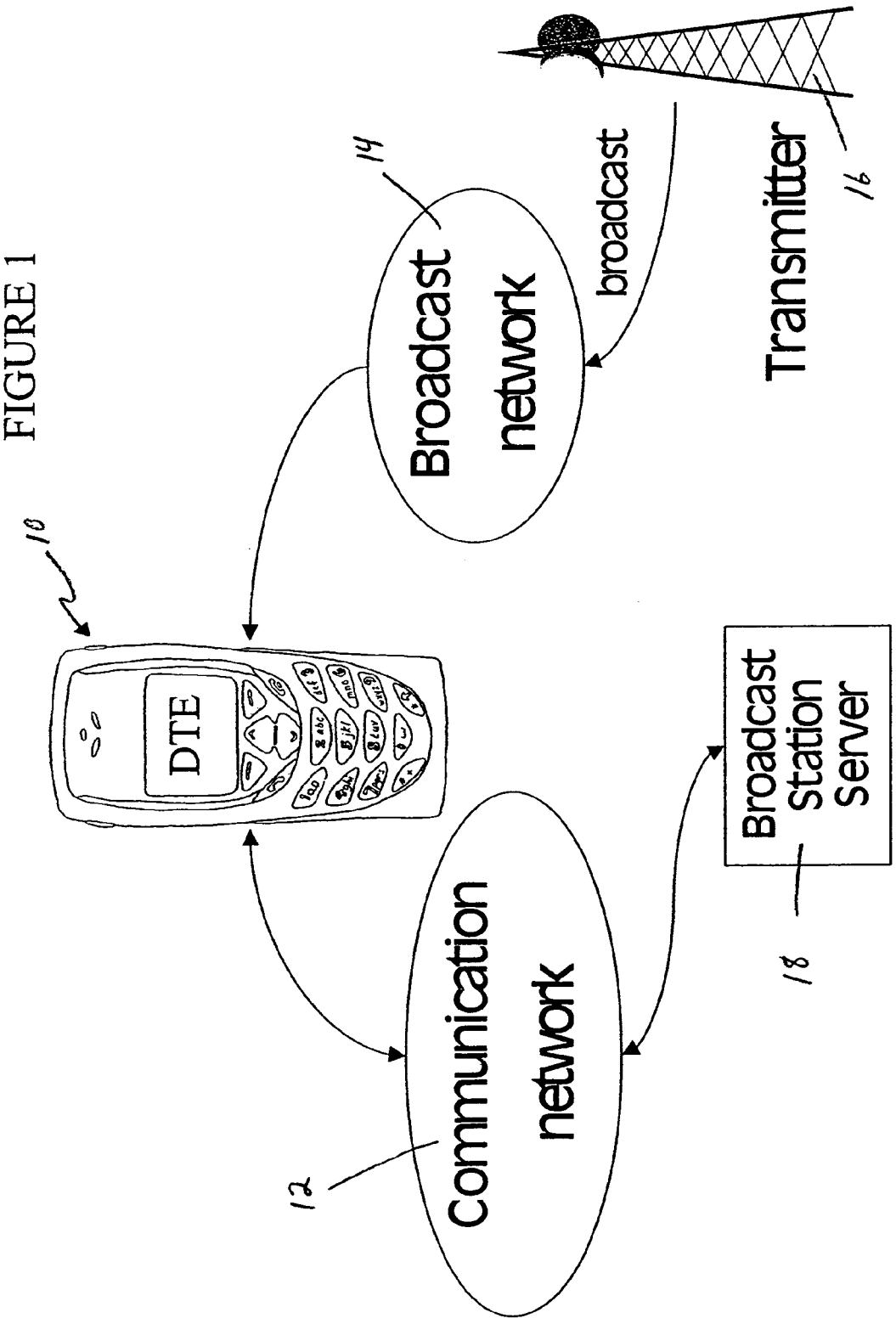
FIG. 1 shows a layout of a system according to an embodiment of the present invention including a mobile device adapted to receive radio broadcasts and that is in communication with a communication network.
Figure 2:
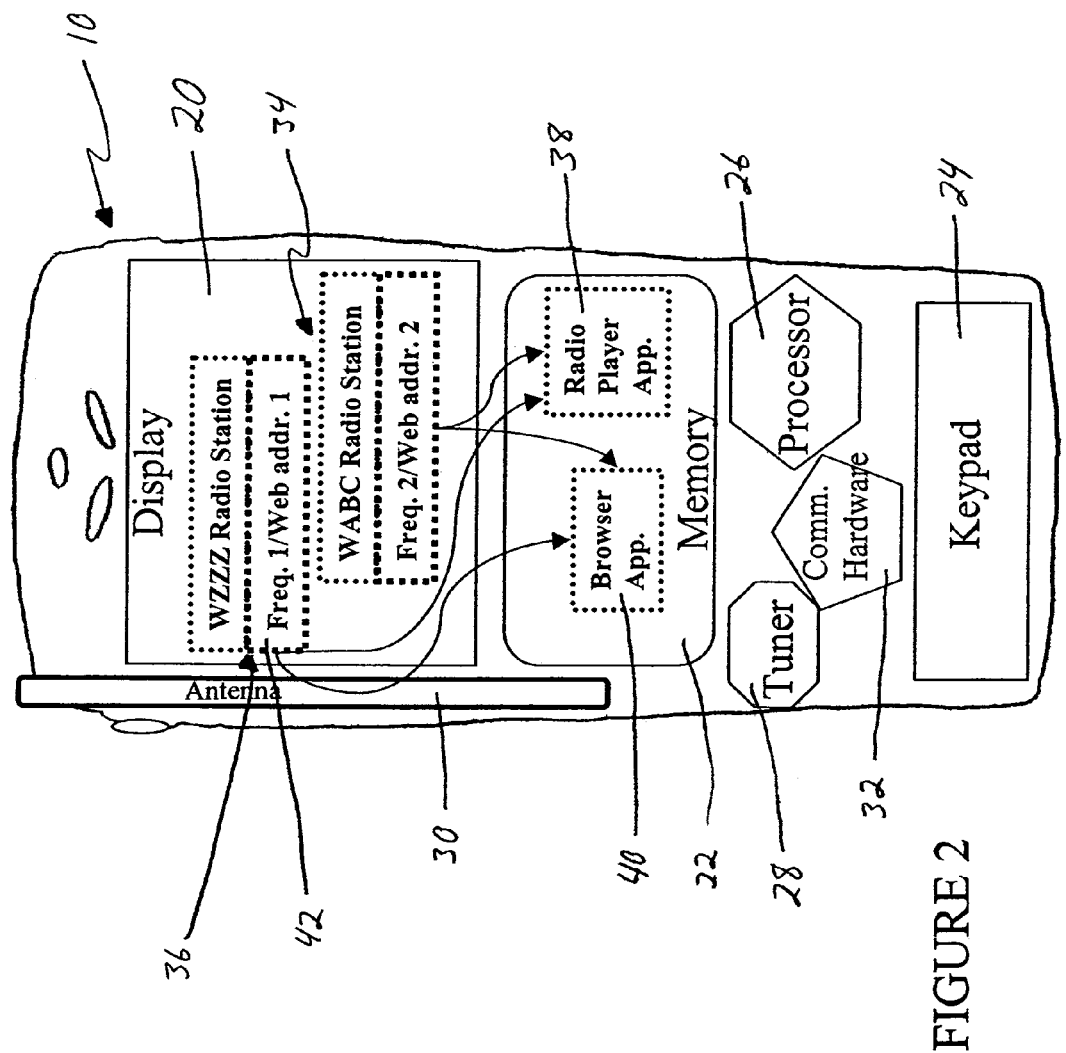
FIG. 2 shows a functional block diagram of an exemplary embodiment of the device of FIG. 1.

As shown in FIGS. 1 and 2, one embodiment according to the present invention includes a mobile data terminal device (DTE) 10 in communication with a data communication network 12 and a broadcast network 14. DTE 10 generally includes any mobile device capable of receiving media broadcasts and interacting with a digital communication network. The broadcast network may include radio waves associated with a radio station (not shown) that are transmitted from a transmitter 16, or may include television, satellite or other types of digital or analog broadcasts. The data communication network 12 may communicate with a broadcast station server 18 also associated with the radio station (not shown). DTE 10 generally includes a display screen 20, memory 22, a keypad 24, a processor 26, a radio tuner 28, an antenna 30, and communication hardware 32. As is known in the art, the processor 26 performs steps according to instructions stored in the memory 22 and generally interacts with other components of the DTE 10. The display screen 20 displays images and the keypad 24 is adapted to receive inputs from an operator.

The antenna 30 may receive radio waves in the radio broadcast network 14 transmitted by the transmitter 16, as is known in the art. The radio tuner 28 is connected to the antenna 30 and is adapted to tune, demodulate and amplify selected frequencies of radio waves received by antenna 30, such as those transmitted from transmitter 16. The radio tuner 28 is a digital phase-locked loop (PLL) synthesizer that is able to be retuned within milliseconds. The communication hardware 32 is adapted to receive and modulate or demodulate wireless communication signals, such as microwaves, sent or received from the DTE 10, as is known in the art. Thus, the device 10 according to one embodiment comprises a mobile device that is capable of receiving radio station broadcasts while simultaneously communicating with a data network. The device of the present invention, however, is not limited to any particular embodiment of a device, provided the device has both data connectivity and broadcast reception capabilities.

Further, the device of present invention is not limited to any particular embodiment for enabling data connectivity or broadcast reception. For example, the DTE 10 may use a circuit switched connection for data connectivity, such as a second-generation wireless system using TDMA (Time Division Multiple Access), CDMA (Code Division Multiple Access), GSM (Global System for Mobile Communications), or other such access systems. In other examples, DTE 10 may use a packet based access system, such as GPRS (General Packet Radio Service) over a GSM network, or short range connectivity systems such as WLANs (Wireless local area networks) or BLUETOOTH. With regard to broadcast tuning, DTE 10 may receive, for example, analog radio transmissions, digital radio transmissions, satellite radio transmissions, analog television transmissions, digital television transmissions, or other such broadcasts.

According to one embodiment, radio bookmarks 34 are stored in the memory 22, and may be programmed and selected by the user. The radio bookmarks 34 generally include handles or identifiers pointing to various resources such as files, Internet protocol (IP) addresses, uniform resource locators (URL), and the like. The bookmarks may also include parameters that further define the bookmarks. The radio bookmarks 34 generally have combined functionality such that selection of a bookmark 34 results in selection of both a network address and a radio frequency, both of which are associated with a particular radio station. Accordingly, a user simply selects a radio bookmark 34 in order to tune the tuner 28 to frequencies of radio waves for a radio station, such as those transmitted by transmitter 16, and to substantially simultaneously connect the device 10 with a server located at a network address associated with the radio station, such as broadcast station server 18.

For example, suppose that the radio transmitter 16 transmits FM radio waves for a certain radio station (not shown), for instance a radio station having the call sign WZZZ, and that the broadcast station server 18 is operated by radio station WZZZ. Suppose also that radio station WZZZ maintains a web site on broadcast station server 18 that provides information supplemental to its FM radio broadcast. Suppose also that the radio station is a favorite radio station for the user and that the user has programmed bookmark one 36 to include frequency information for the radio station broadcast and the network address of the radio server 18. As such, in order to listen to the radio broadcast and to view web content for the radio station, the user merely needs to select bookmark one 36. The user may select bookmark one 36 using keypad 24 to select a representation of bookmark one 36 shown on the display 20, as is known in the art for graphical user interfaces. Alternatively, the user may select a key on keypad 24 associated with bookmark one 36, or use other such methods to choose a bookmark.

Figure 3:
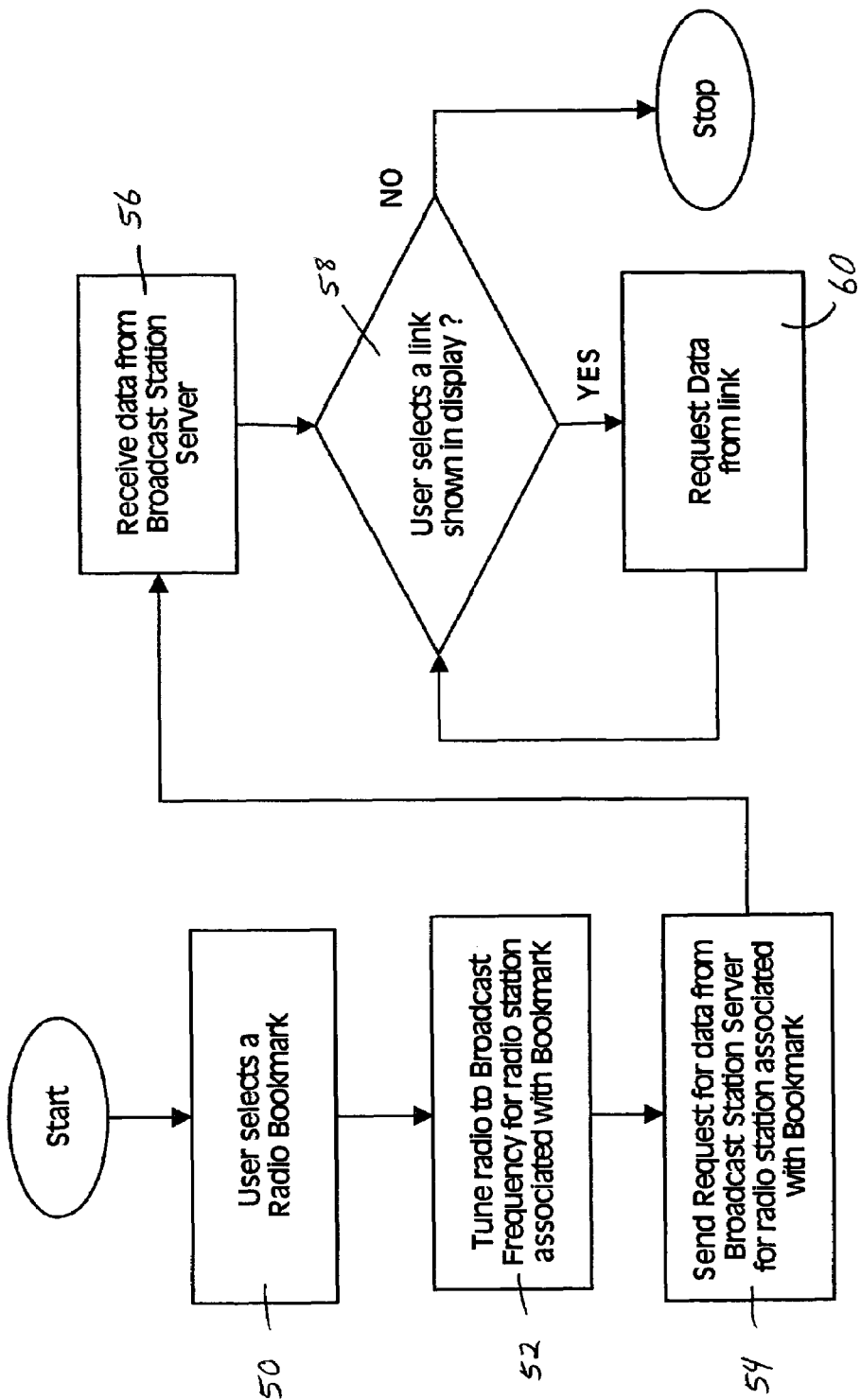
FIG. 3 shows a flow diagram for operation of the system of FIG. 1 in accordance with selection of a radio bookmark according to an embodiment of the present invention.

Referring now to FIG. 3, when the user selects bookmark one 36, the processor follows instructions stored in the memory 22 and performs associated steps. Accordingly, the processor 26 detects 50 the user's selection of bookmark one 36. Bookmark one 36 points to both a radio player application 38 stored in the memory 22 and a browser application 40, such as a wireless markup language (WML) application. Bookmark one 36 also includes parameters 42 that include frequency information for radio station WZZZ and web site address information. Parameters generally include information or data that further define one or more bookmarks or that affect performance of the DTE 10 based on selection of associated bookmarks. Parameters may include frequency information and network address information, as well as other types of information, some examples of which are discussed below.

Selection of bookmark one 36 invokes both radio player application 38 and browser application 40, and provides information in parameters 42 to the respective applications 38, 40. According to the radio player application, the processor 26 tunes 52 the radio tuner 28 to the frequency parameter 42 for bookmark one 36 for receiving the associated radio station broadcast. According to the browser application 40, the communication hardware sends 54 a request to the network address of broadcast station server 18 requesting data for the radio station website. The step of sending 54 a request may include opening a communication channel using communication hardware 32, if it is not already open. For example, if communication with communication network 12 is via a circuit switched connection like GSM, then the connection is open for the time of service and is closed when service use ends. Thus, a communication channel may need to be opened prior to sending 54 any requests. This may also be applicable for a packet switched connection, such as GPRS, if the connection has not yet been established.

In response to sending 54 a request, the broadcast station server 18 returns data to the device 10 and the processor 26 receives 56 the data. At this point, a session may be established with broadcast station server 18, which is managed by the browser application 40 and the server 18. In accordance with one embodiment, when data is received, the processor displays a web page (not shown) for the radio station, which includes links that the user may select. In accordance with another embodiment, update data is frequently received to update the web page. In this way, regardless of user input, information displayed on DTE 10 is substantially synchronized with the radio broadcast to reflect current content of the broadcast, such as the name of a song being played or to provide input opportunities, such as for a quiz or contest being broadcast on the station. When the processor detects that the user selects 58 a link shown in the display 20, the processor 26 directs the device 10 to request 60 data from broadcast station server 18 for that link. Accordingly, by simply selecting bookmark one 36, the user may simultaneously listen to the radio station broadcast and browse the radio station web site, thereby having means to receive information supplemental to the radio broadcast.

In another embodiment of the invention, interactions with the broadcast station server 18 may occur via short messaging service (SMS) and/or multimedia messaging service (MMS) messages. Accordingly, upon selection 50 of a bookmark, DTE 10 sends a message, such as an SMS text message, to server 18. The SMS message (not shown) informs server 18 that DTE 10 has started listening to the radio station and requests 54 associated data from the server. In response, server 18 sends one or more SMS or MMS messages to provide content feed. The frequency of these messages may vary. For example, only one initial message may be provided to display a current program being broadcast by the radio station. Alternatively, messages may be sent at set intervals, such as every 5 minutes, or at set times, such as when a new song is played. Further, DTE 10 preferably sends a SMS message to server 18 when DTE 10 tunes to another radio station, thus informing server 18 of the change and terminating further messages from the server.

In a further embodiment of the invention, the frequency and IP address parameter information may not be stored on the device, but may be stored remotely, such as on a server in communication with network 12. This provides many benefits, such as allowing the user to program radio bookmarks for different radio stations depending on other programmed parameters. For example, the user may desire bookmark one 36 to represent the strongest classical music radio station for the user's present location. This may be particularly beneficial for a user who travels frequently. The user's present location is an example of an additional parameter that may be useful for adding flexibility to the use of radio bookmarks. The user's location may be automatically determined, for example, using global positioning system (GPS) technology, but the present invention is not limited to GPS or any other positioning technology.

In another example, a parameter could be a unique apparatus id associated with the DTE 10, such that the radio frequency and IP address for a particular bookmark are related to the apparatus id. Another example of a parameter is a unique user id, wherein the radio bookmarks on a device are adapted according to a unique user id, such as username and password. Multiple parameters can add even further flexibility. In a further example, the bookmarks 34 on a particular device 10 may represent different radio stations for different users of the device. As such, a user may need to input a unique user id, which may be manually entered as a username and password, or entered through the insertion of an identification module in to the device, or other like means. Accordingly, the parameter may be a unique user id and the bookmarks may represent radio stations or preferences for radio stations according to individual users' programming.

In further examples, parameters may include preferences established by the user, such that a bookmark represents different stations based on the time of day, location, or other factors. For example, a user may prefer that bookmark one 36 refer to travel information during rush hour, rock music during the daytime, and classical music in the evening. In another example, a user profile may be established based on statistical information of the user provided to a bookmark web site that creates bookmarks. The bookmark website may forward bookmarks to DTF 10 that the user could choose to accept. In a different example, a bookmark could represent a particular station, and based on a location parameter for the user, a different broadcast frequency may be applicable for that station. In an example with a radio station chain, the bookmark could represent the chain, and based on a user location parameter, a frequency for a station within the chain could be appropriate.

The bookmarks 34 and their parameters may be programmed according to software stored on the DTE 10 using keypad 24, or through an interface with another computer such as through a universal serial bus (USB) connection or network communications, or other known methods for programming mobile data terminals. In other examples, the bookmarks 34 and their parameters may be programmed remotely and sent to DTE 10 over the air (OTA). In such an example, a friend of the user may send a bookmark to the user as a recommendation for a broadcast station. This could be accomplished using a short messaging service (SMS), such as Nokia SMART MESSAGING. In another example, a user may request a bookmark from a broadcast station using an SMS message, or through a web-based service. Further, a broadcast station server may send a whole set of bookmarks based on a user profile. In a further example, a user may use a web-based service to configure their bookmarks remotely for DTE 10, and then update DTE 10 via OTA communications. In yet another example, bookmarks may be transmitted using Cell Broadcasting Service (CBS), wherein only bookmarks corresponding to available radio stations in the area are transmitted to respective users. In general, when DTE 10 receives a message that is recognized as a bookmark, it may automatically, or after user verification, store the bookmark in memory.

Figure 4:
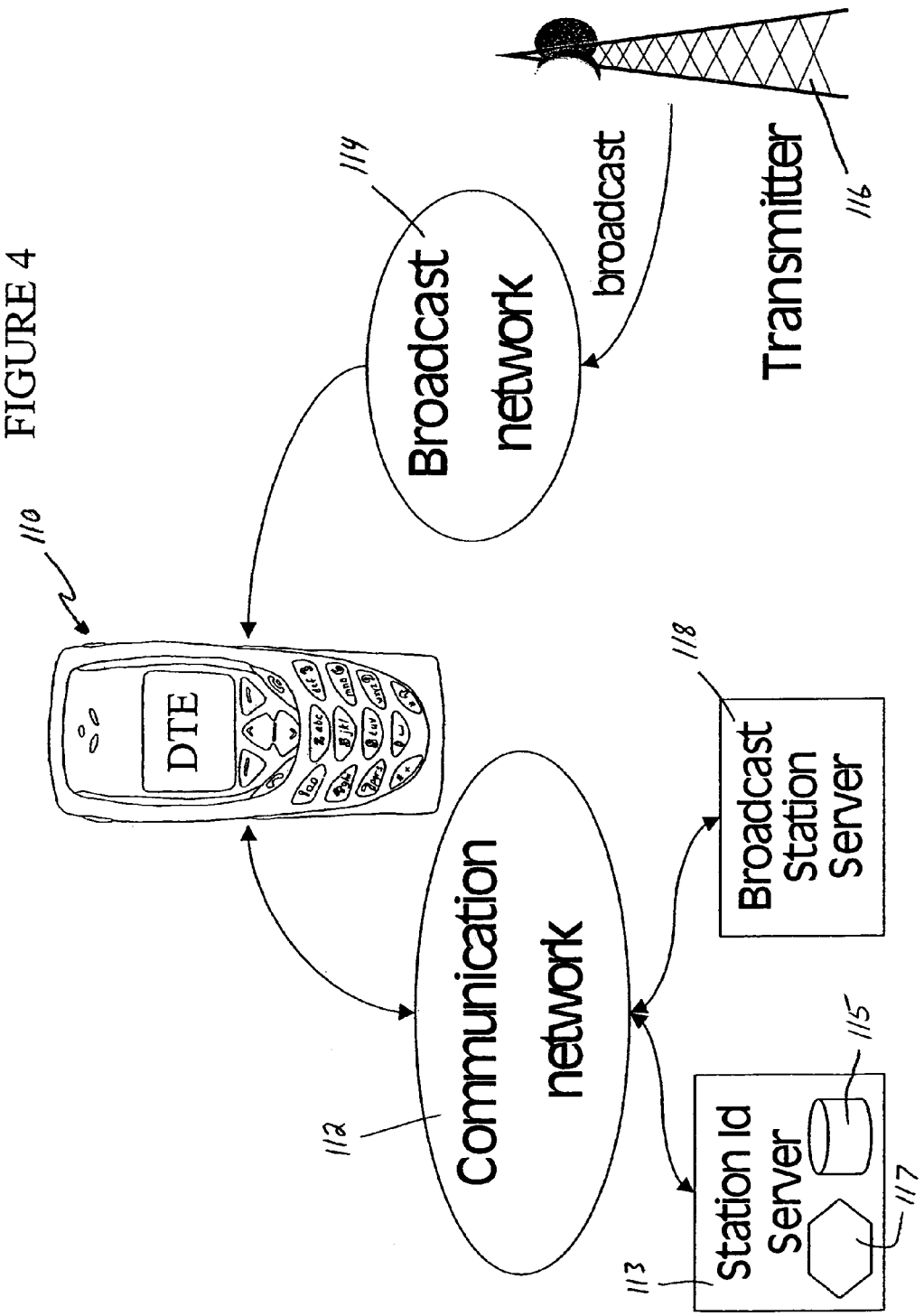
FIG. 4 shows a layout of another embodiment of a system according to the present invention including a mobile device adapted to receive radio broadcasts that is in communication with a communication network.
Figure 5:
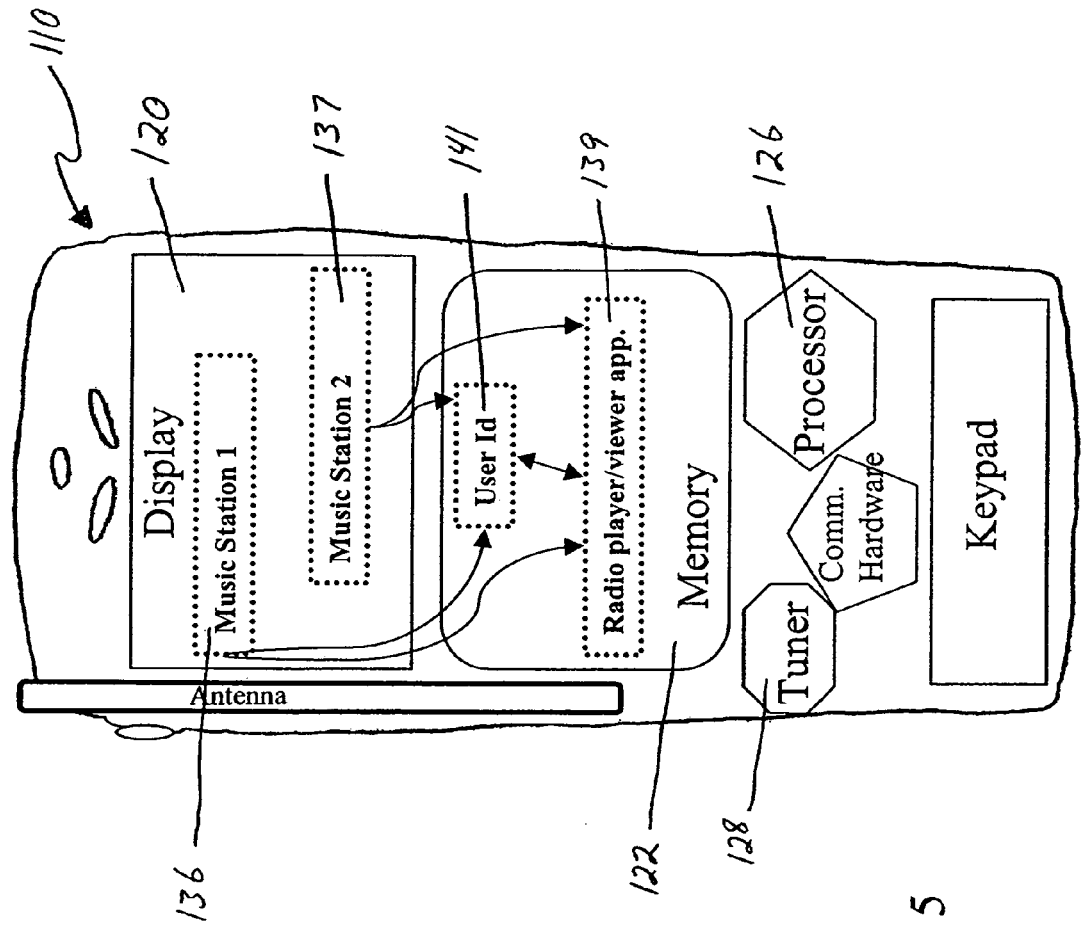
FIG. 5 shows a functional block diagram of an exemplary embodiment of the device of FIG. 4.

To provide further flexibility and further illustrate the use of parameters with bookmarks, another embodiment of the present invention, as shown in FIG. 4, includes a mobile terminal device (DTE) 110, a station id server 113, a broadcast station server 118, and a transmitter 116. The DTE 110 may be in communication with communication network 112 and broadcast network 114. The station id server 113 and broadcast station server 118 are generally in communication with communication network 112. The transmitter 116 broadcasts radio waves in broadcast network 114. The station id server 113 generally includes a server that identifies a broadcast station based on a bookmark selected and other parameters sent to the station id server. The station id server 113 generally includes a storage medium 115 and a processor 117 for processing instructions contained in the storage medium. For illustration purposes, suppose that the user shares DTE 110 with a family member and has therefore manually entered a unique user id that identifies the user and his bookmark preferences. Suppose further that the device 110 is generally configured as shown in FIG. 5, which is similar to DTE 10 in the previous embodiment except for differences and aspects discussed herein.

Accordingly, DTE 110 includes bookmark one 136 and bookmark two 137, which are stored in memory 122 and are graphically displayed on display 120. Each of the bookmarks 136, 137 point to a radio player/web site viewer application 139 and the parameter of a user id 141. The player/viewer application 139 according to one embodiment is a browser application running a Flash or SMIL (Synchronized Multimedia Integration Language) plug-in. The application 139 may be included in the terminal's initial software suite, or it may be downloaded or otherwise installed on DTE 10. When bookmark one 136 is selected, it invokes application 139 and points it to the unique user id 141 stored in memory 122. The application 139, based on the bookmark selected and the user id 141, instructs the processor 126 to set up the DTE to receive a broadcast and connect with a web site for the selected bookmark and user id parameter. Thus, bookmarks may be uniquely configurable for different users of the same device.

Figure 6:
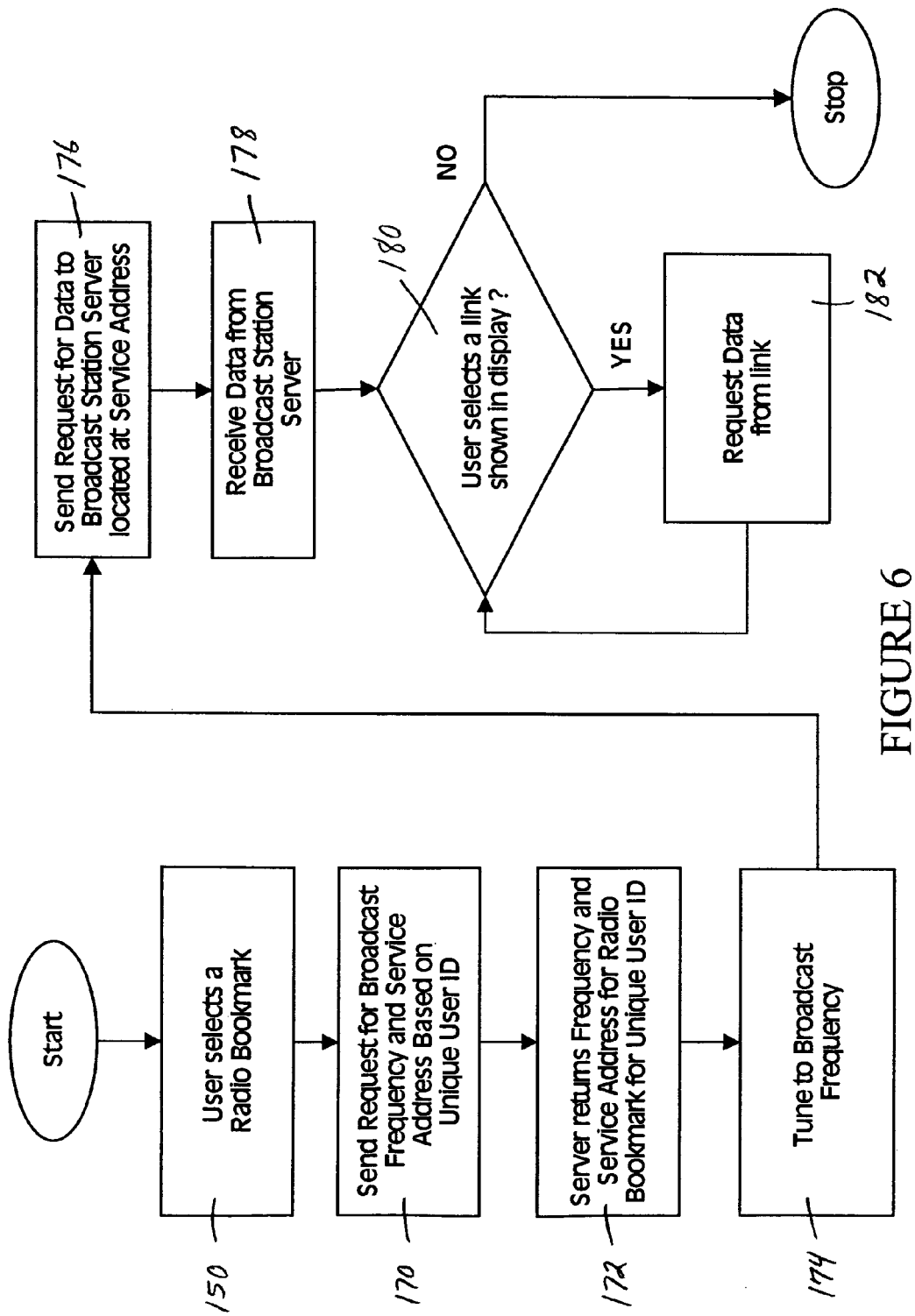
FIG. 6 shows a flow diagram for operation of the system of FIG. 4 in accordance with selection of a radio bookmark according to an embodiment of the present invention.

Use of the present invention according to such an embodiment is generally illustrated in FIG. 6. The user starts the process in step 150 by selecting a radio bookmark, for example bookmark one 136, on the DTE 110. In response to selection of bookmark one 150, which invokes application 139, the processor 126 performs the step of sending 170 a request for radio broadcast frequency information and a network service address of a radio station broadcast station server 118 to the station id server 113. The request is related to a particular bookmark, such as bookmark one 136, and is based on related parameters, such as unique user id 141. The station id server 113 receives the request including the unique id parameter 141, determines the appropriate frequency information and network address information for bookmark one 136 and unique user id 141, and returns 172 the information to DTE 110 via the communication network 112. The DTE 110 thereafter tunes 174 the tuner 128 to receive the radio broadcast and requests 176 data from the broadcast station server 118 located at the network address returned. Server 118 preferably sends data associated with the radio station web site, which DTE 110 receives 178 via network 112. The user is therefore able to view the web site display for the server 118 and may select 180 a link shown on the web site display. In response to such a selection, the processor 126 requests 182 data associated with the selected link.

Figure 7:
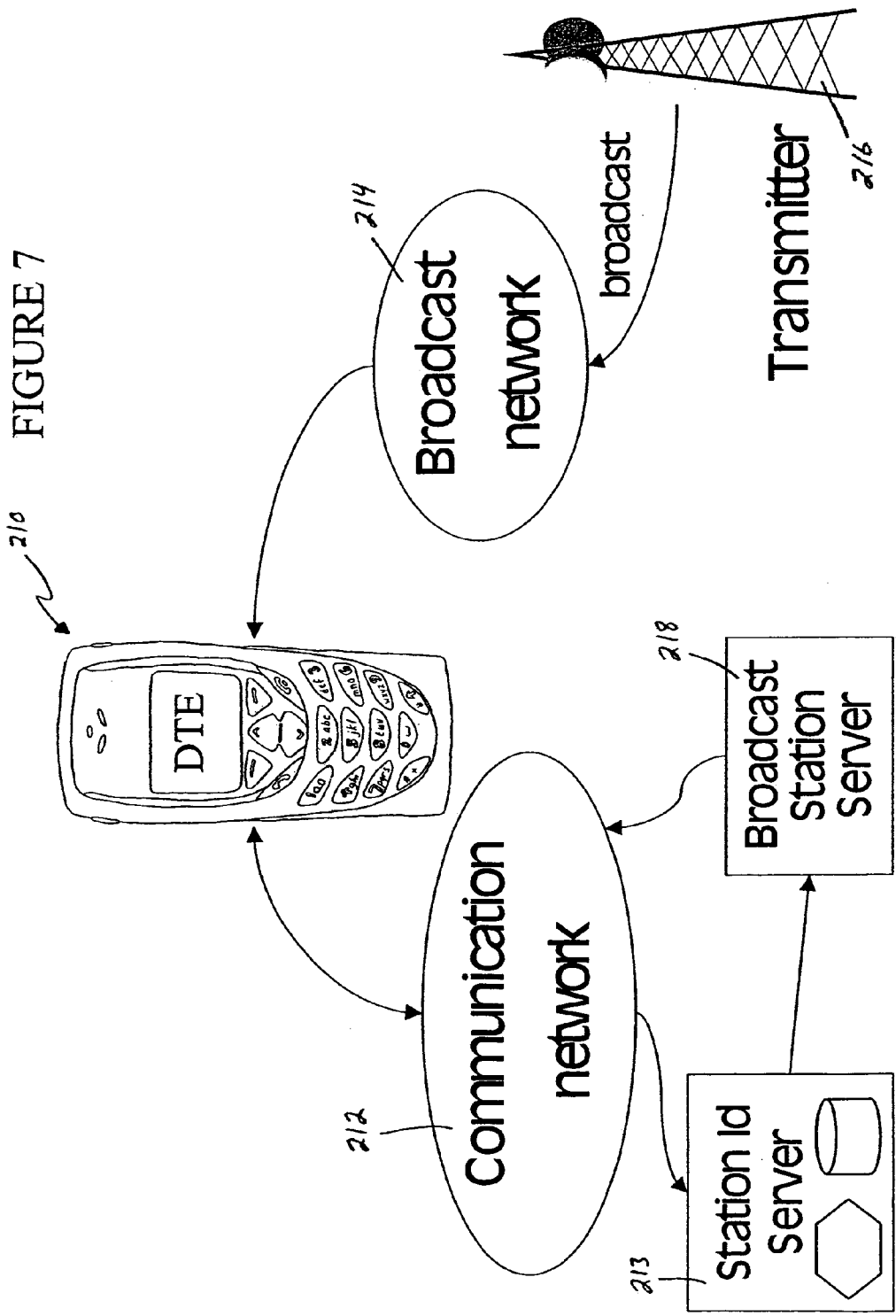
FIG. 7 shows a layout of a further embodiment of a system according to the present invention including a mobile device adapted to receive radio broadcasts that is in communication with a communication network.
Figure 8:
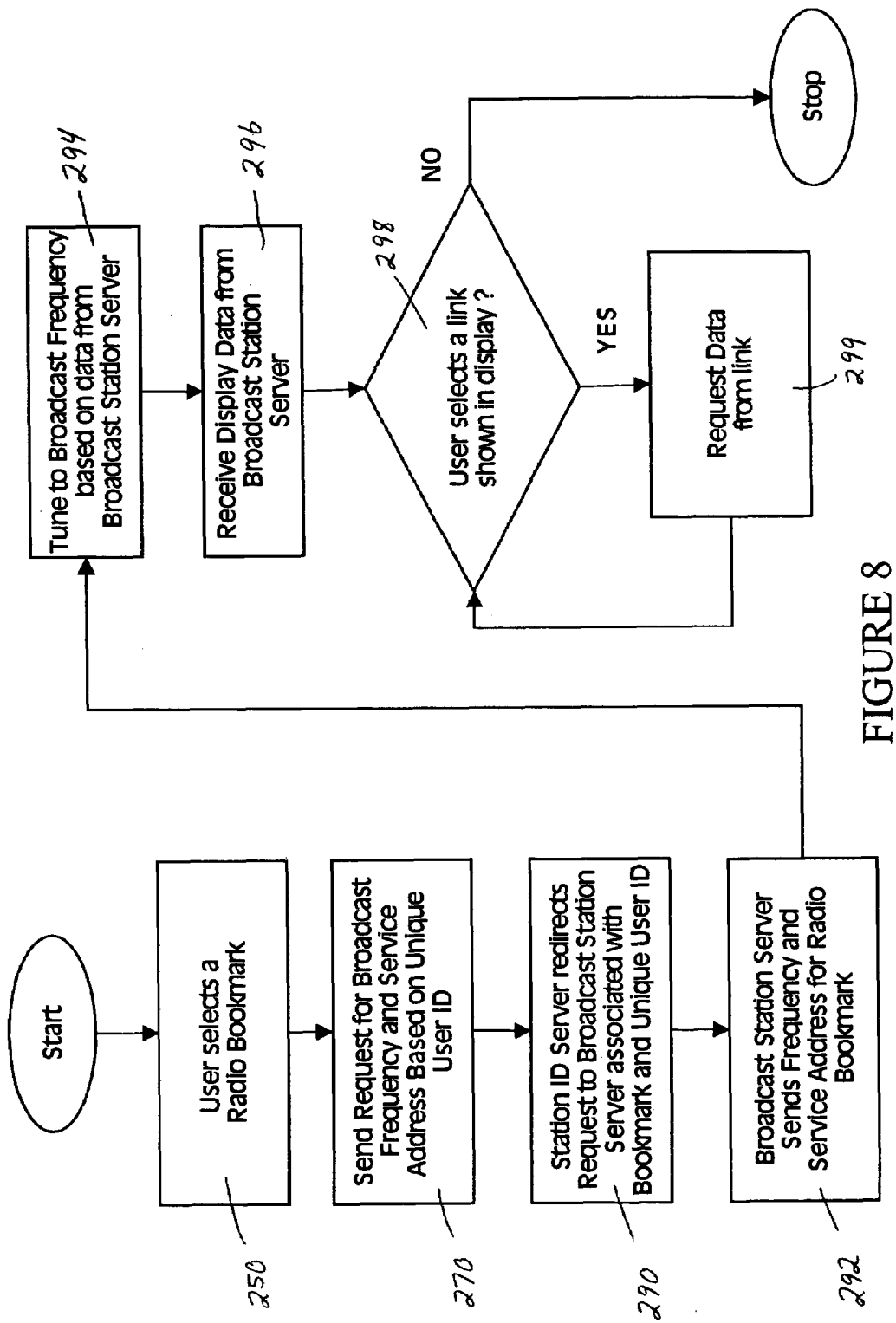
FIG. 8 shows a flow diagram for operation of the system of FIG. 7 in accordance with selection of a radio bookmark according to an embodiment of the present invention.

Referring now to FIGS. 7 and 8, a further embodiment of the present invention is shown, which generally includes all aspects and preferences of the previous embodiment except with regard to message flows between DTE 210, station id server 213, and broadcast station server 218. Like numbers shown herewith, refer to like components, steps and features as previous embodiments. Accordingly, as a user selects 250 a radio bookmark on DTE 210, the processor receives the inputs and sends 270 a request to the station id server 213 via network 212. The request is likewise for broadcast information and a network address for server 218 for a radio station based on the bookmark selected and the parameter of a user's unique user id. The station id server 213 selects the appropriate radio station for the bookmark selected and parameters sent, and redirects 290 the request for the network address of server 218 to server 218 for the selected radio station. The broadcast station server 218 in turn sends 292 frequency information and the network address for its website to DTE 210.

After receiving frequency and network address information from server 218, the DTE 210 tunes 294 the tuner to receive the radio station broadcast. Preferably, included with the information sent from server 218 is web site data for the radio station's web site. Accordingly, as DTE 210 receives 296 the web site data it displays the web site information on DTE display. If the user then selects 298 a link from the web site display, DTE 210 sends 299 a request for data according to the link via network 212. The request for data associated with the link may be to a different server in communication with network 212 or to server 218.

FIGS. 9-16, along with FIGS. 1-4, show other embodiments that generally include the aspects and preferences of the first embodiments illustrated with FIGS. 1-4. A user who travels frequently, such as a long-distance commuter or a salesperson, may desire to view bookmarks for stations available in his current geographical location or for a user-requested geographical location. As such, if desired by the user, it would be helpful for the mobile device to automatically determine the user's current location and to display bookmarks accordingly. Further, scrolling through bookmarks for available stations in a geographical location may be improved by representing the bookmark for each available station with graphical information about the station. Scrolling as used herein generally refers to reviewing a group of bookmarks on the mobile device. The bookmarks may be reviewed in numerous ways. For example, a list of bookmarks may be viewed by moving along the list in different directions (e.g. sideways, diagonally, upwards and downwards). In another example, a group of bookmarks may be viewed by navigating a user interface that displays the bookmarks in various views and sequences.

Figure 9:
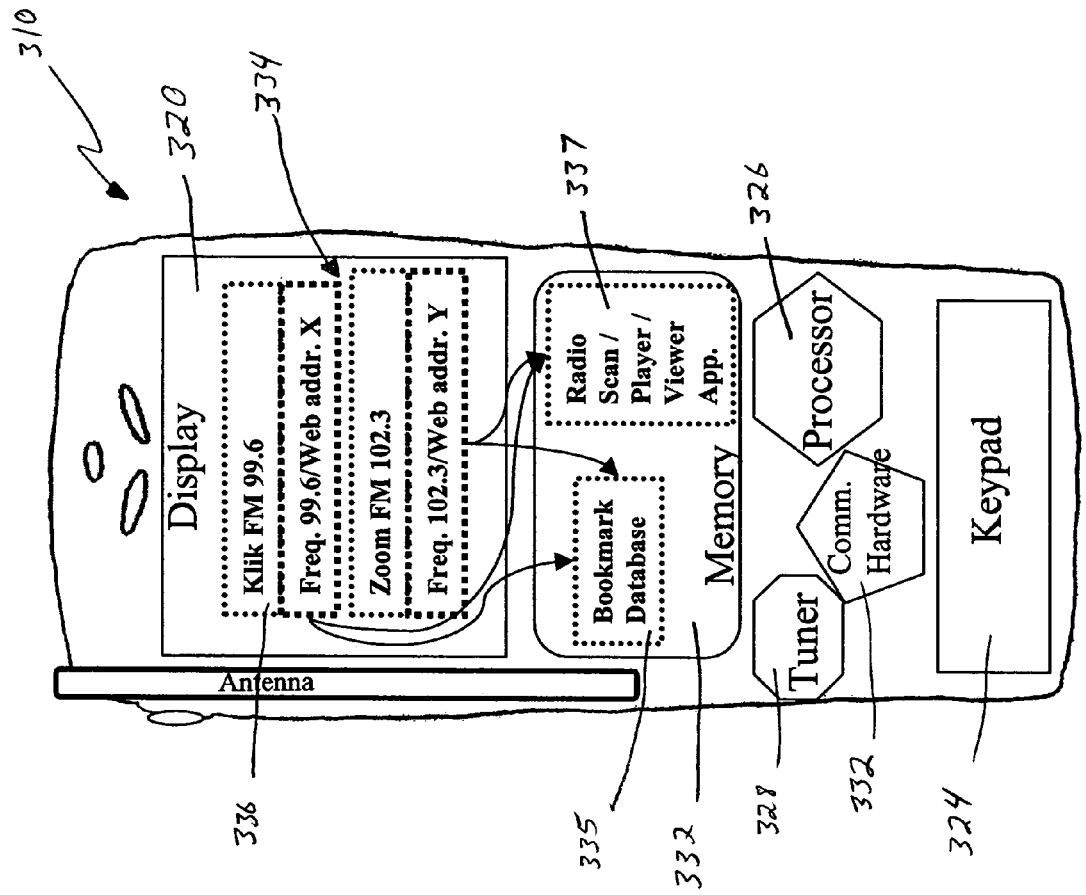
FIG. 9 shows a functional block diagram of a mobile device according to a further embodiment of the invention.

Referring now to FIG. 9, DTE 310 is shown that is adapted to graphically represent available bookmarks for a geographical area and to indicate the data interactivity capabilities of associated stations. DTE 310 is generally the same as DTE 10 of FIG. 2, except that bookmarks 334 are related to a geographical location parameter of DTE 10 and that memory 332 includes a bookmark database 335 and a radio scan/player/viewer application 337. Bookmark database 335 contains bookmarks and a geographical location parameter (not shown) associated with each bookmark, and may optionally include a graphic, such as a station logo, representing the associated station or a pointer to a file containing the graphic. Database 335 may further include further parameters or other information related to each bookmark. Application 337 may be a browser application running a Flash or SMIL (Synchronized Multimedia Integration Language) plug-in for providing tuning and scanning capabilities along with providing website interactivity. Application 337 could also be a dedicated broadcast media application, such as an application that runs in a JAVA 2 Micro Edition (J2ME) environment.

Application 337 is adapted to provide bookmarks in accordance with a geographical location parameter and to determine current geographical location information. For example, geographical location information may be determined by DTE 310 based on interactions with a cellular network, via graphical positioning system (GPS) techniques, or through broadcast media transmissions that include radio data system (RDS) messages. In another example, the user may simply input geographical location information into DTE 310 via keypad 324.

Figure 10:
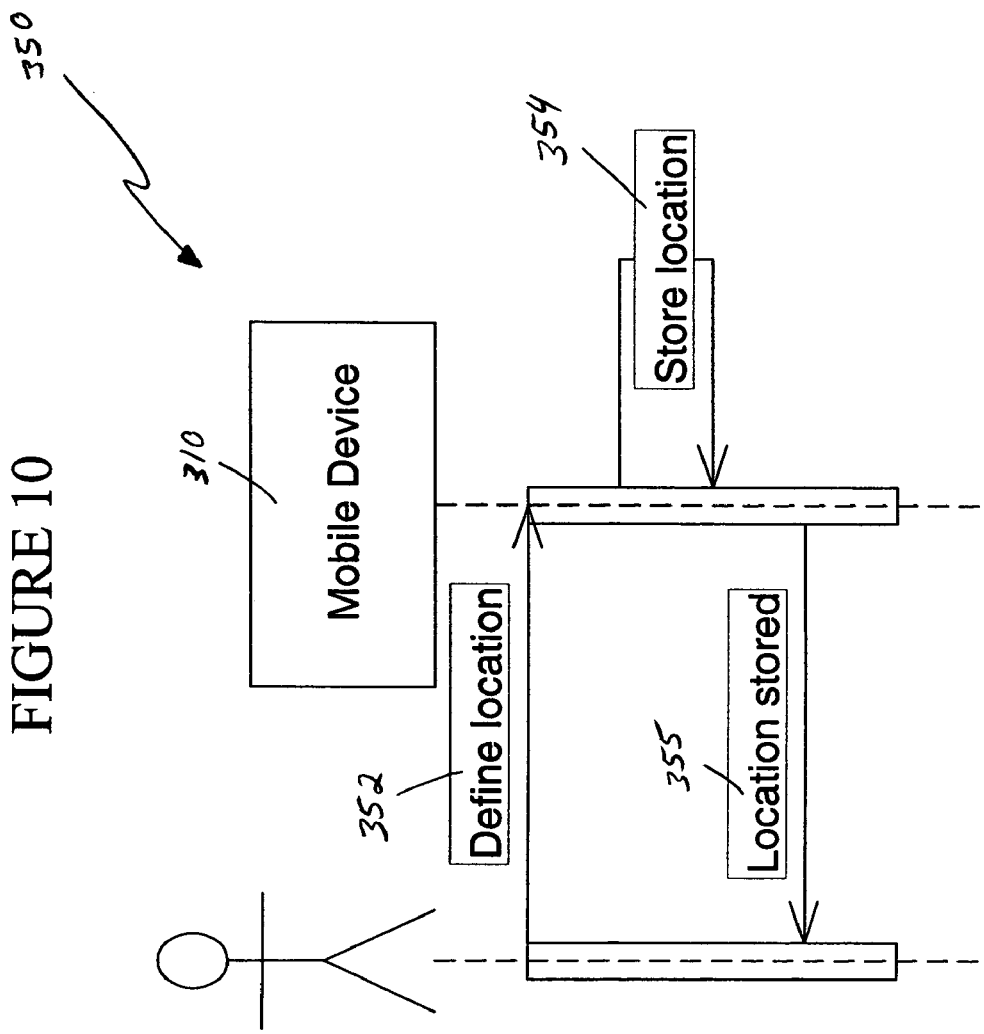
FIG. 10 shows a method for determining the location of the mobile device of FIG. 9 according to an embodiment of the invention.

FIG. 10 illustrates a user-input method 350 for determining geographical location information according to an embodiment of the invention. As shown, the user may define his location by inputting 352 location information via keypad 324, which is then stored 354 in memory 332. The geographical location information may further be displayed 355 on display 320 to show to the user that it has been stored on DTE 310. Geographical location information may include, for example, a zip code or a city. Such a method may be desirable, for instance, if the user wants to view bookmarks for his home location regardless of his current location. In another instance, the user may want to tune to a weak broadcast signal associated with a bookmark for a nearby location that would not be displayed for his current location.

Figure 11:
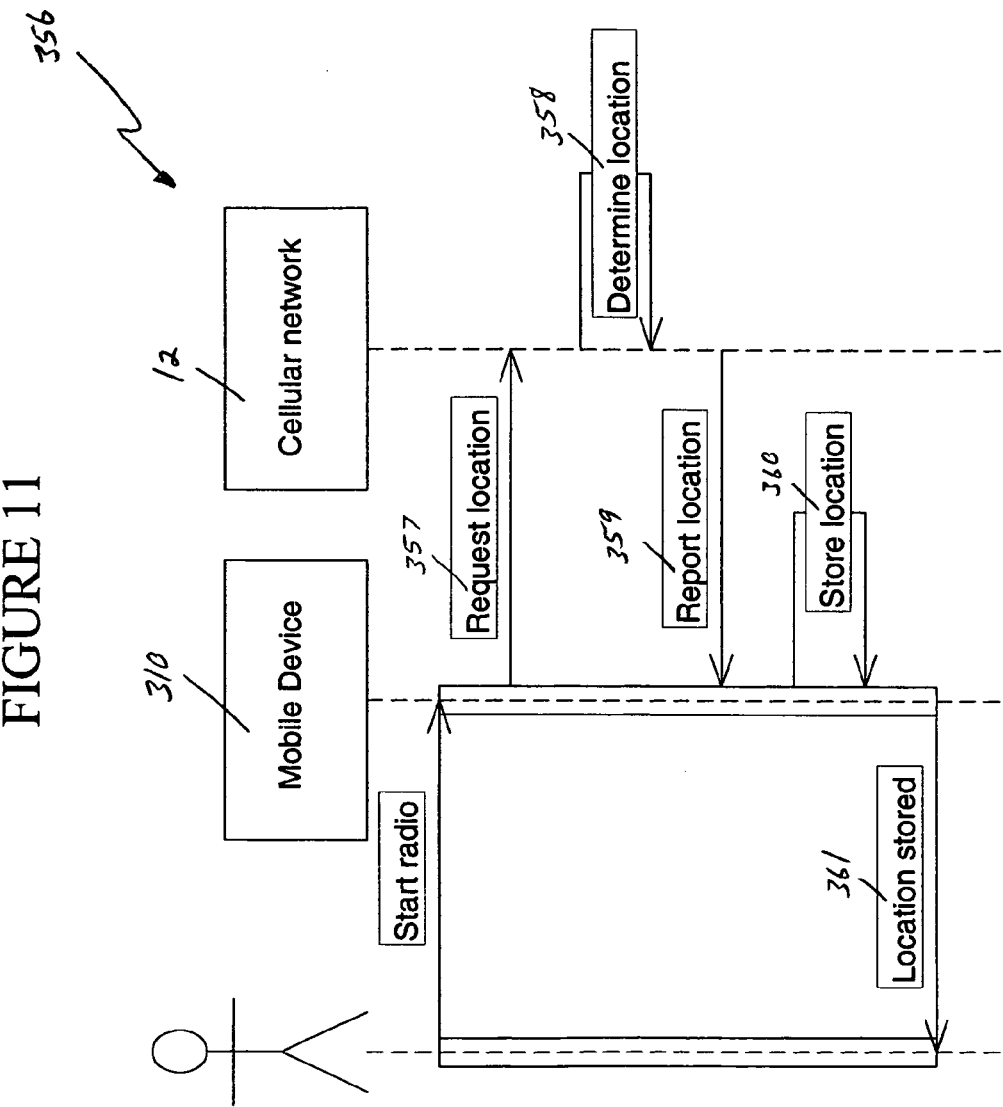
FIG. 11 shows a method for determining the location of the mobile device of FIG. 9 according to another embodiment of the invention.

FIG. 11 illustrates a cellular network method 356 for determining geographical location information on DTE 310 shown in FIG. 9 according to another embodiment of the invention. As shown, in response to executing application 337, the application requests 357 geographical location information from a cellular network 12, such as communication network 12 shown in FIG. 1. The cellular network 12 determines 358 the location of DTE 310 using known methods. For example, based on signal strength of transmissions from DTE 310 and/or triangulation methods using adjacent cells (e.g. angle of arrival (AOA), time difference of arrival (TDOA), etc.), cellular network 12 may accurately determine the location of DTE 310. Once determined, network 12 reports 359 geographical location information to DTE 310. Upon reception of the geographical location information, DTE 310 stores 360 the geographical location information in memory 332. Optionally, DTE 310 may simply monitor an administrative channel for cellular network 12 that provides geographical location information for the current cell. The geographical location information may further be displayed 361 on display 320 to show the user the current location stored on DTE 310.

Cellular network method 356 may be used repeatedly according to programming of application 337 to determine geographical location information. For example, anytime the user reviews bookmarks based on the geographical location parameter, application 337 may instruct processor 326 and communication hardware 332 to update geographical location information. In another example, application 337 may be setup to periodically initiate a request for geographical location information. In a further example, DTE 310 may monitor network 12 and automatically request and store a new location when it determines the location has changed sufficiently, such as based on handover to a different cell or a change in signal strength.

Figure 12:
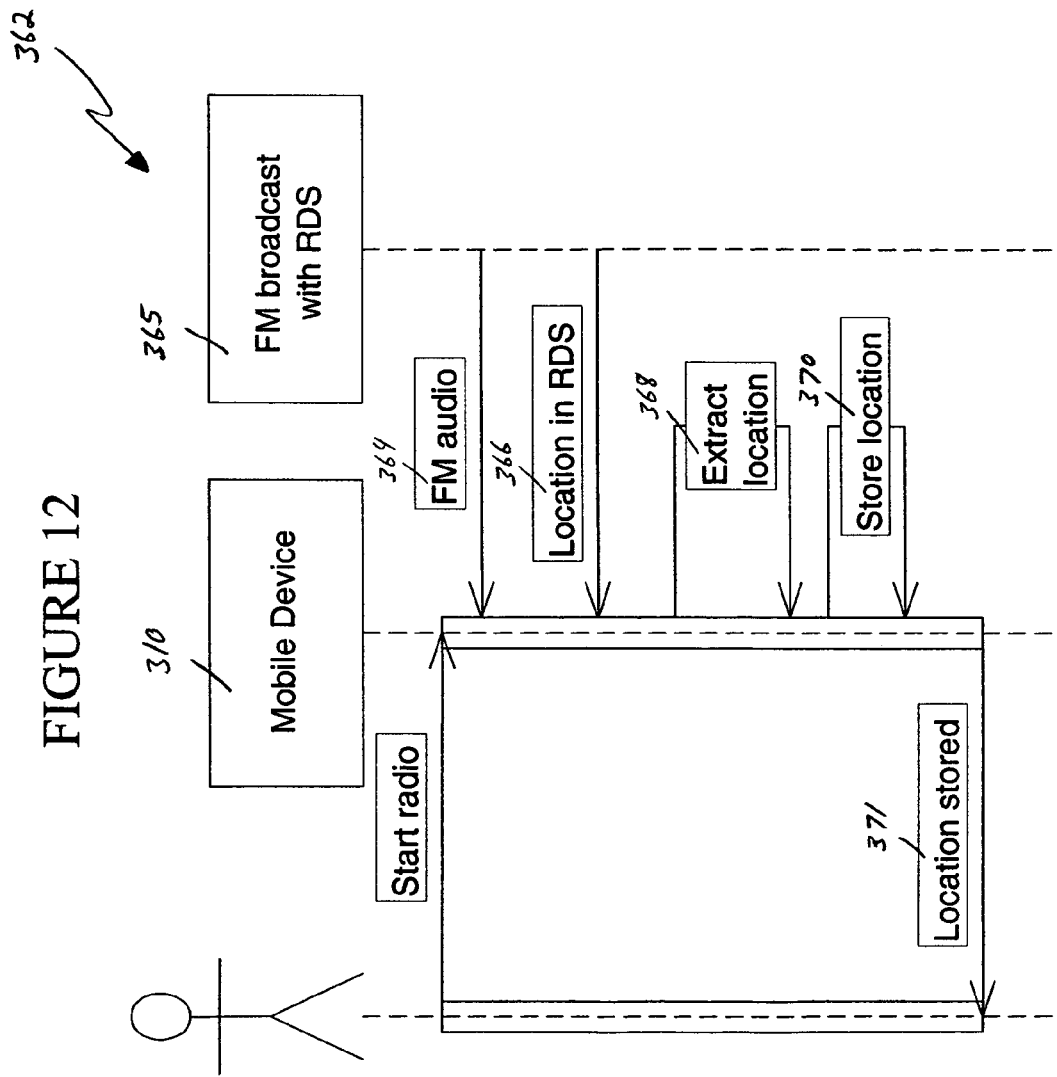
FIG. 12 shows a method for determining the location of the mobile device of FIG. 9 according to a further embodiment of the invention.

FIG. 12 illustrates a radio data system (RDS) transmission method 362 for determining geographical location information on DTE 310 shown in FIG. 9 according to a further embodiment of the invention. RDS technology includes the transmission of limited amounts of data along with FM radio transmissions, and often includes geographical location information. The data is carried inaudibly in one or more subcarrier frequencies that are part of the baseband transmission. DTE 310 for method 362 includes an additional antenna (not shown) and RDS tuner (not shown) for receiving the RDS transmissions. In response to executing application 337, the application receives 364 an FM broadcast 365, which includes receiving 366 RDS location data. Based on the location data (not shown), DTE 310 extracts 368 geographical location information and stores 370 the information in memory 332. The geographical location information may further be displayed 371 to show the user the current location stored in DTE 310.

Figure 13:
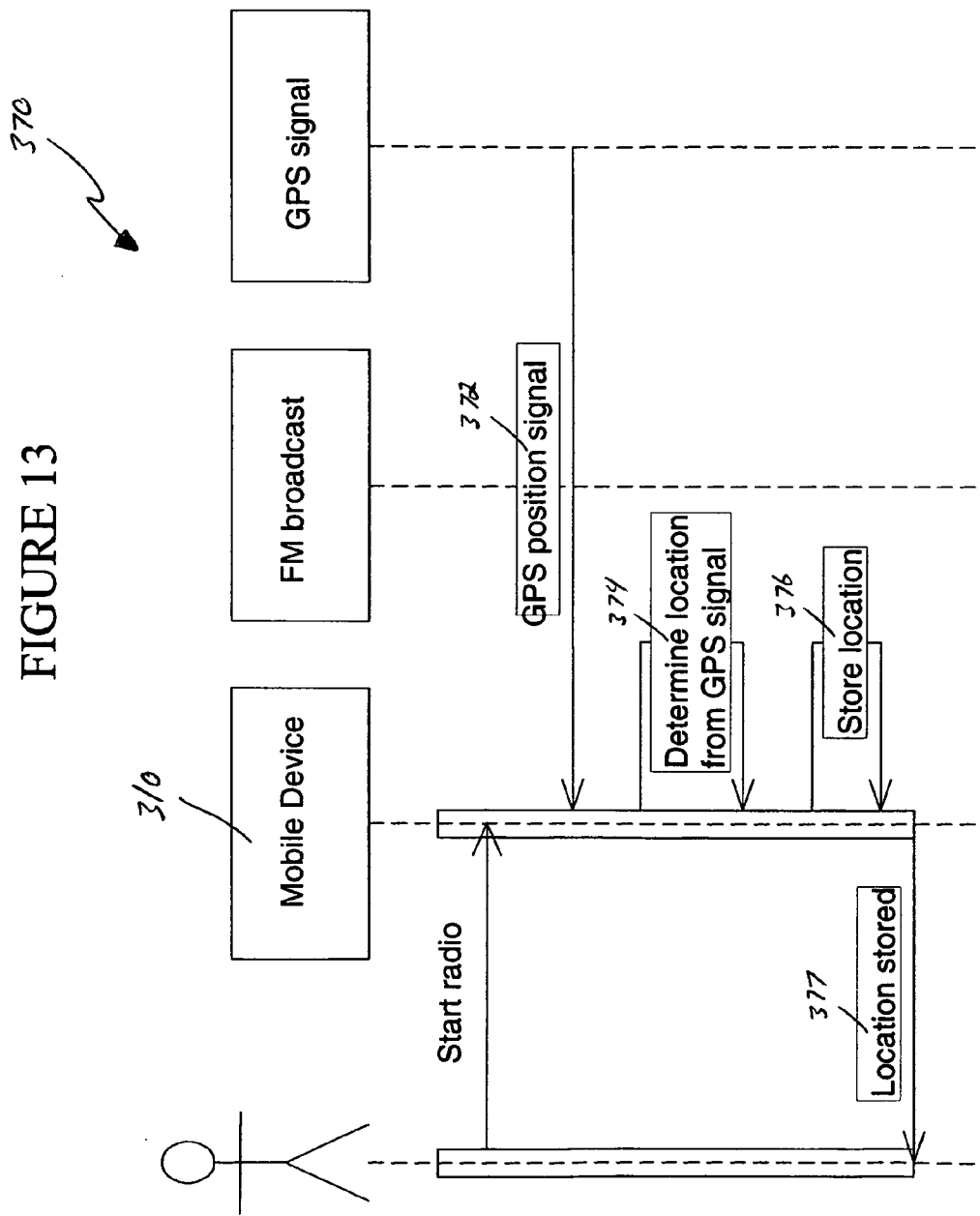
FIG. 13 shows a method for determining the location of the mobile device of FIG. 9 according to yet another embodiment of the invention.

FIG. 13 illustrates a global position system (GPS) method 370 for determining geographical location information on DTE 310 shown in FIG. 9 according to a further embodiment of the invention. As shown, in response to executing application 337, DTE 310 receives 372 GPS signals 373 via a GPS receiver (not shown) as is known in the art. Based on the GPS signals, DTE 310 accurately determines 374 its location. Once determined, DTE 310 stores 376 the geographical location information in memory 332. As with previous embodiments, geographical location information may be determined at regular intervals, whenever bookmarks are accessed by the user, or at other times according to the programming of application 337. The geographical location information may further be displayed 377 to show the user the current location stored in DTE 310.

Figure 14:
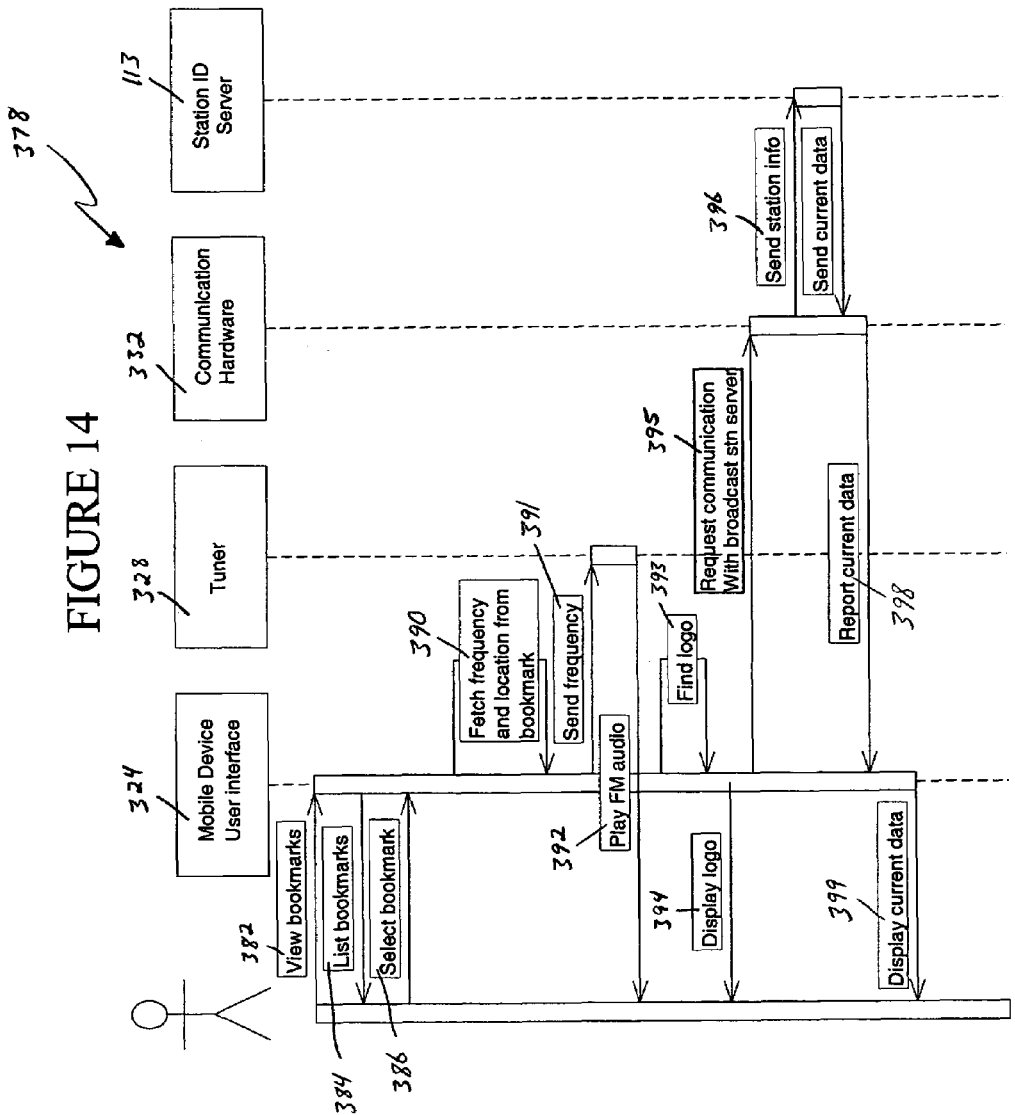
FIG. 14 shows a method for reviewing bookmarks for a geographical location according to an embodiment of the invention.
Figure 15:
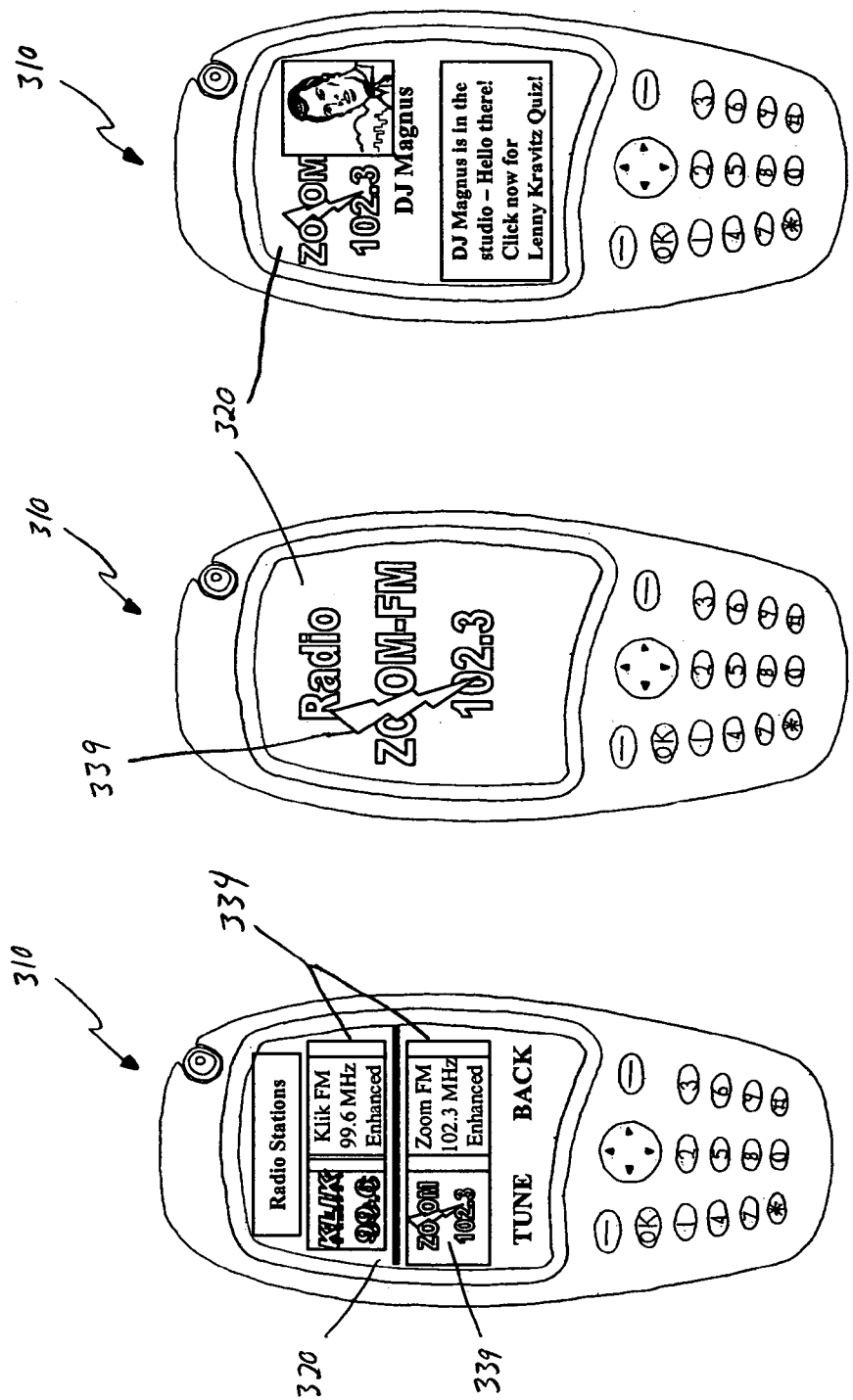
FIG. 15 shows various displays on a mobile device according to steps of the method of FIG. 14.

Referring now to FIGS. 14 and 15, a method 378 is shown for reviewing bookmarks for a particular geographical location, and for receiving a media station broadcast and interacting with a website for the media station based on selection of a bookmark. In accordance with geographical location information, which may be determined, for example, by methods 350, 356, 362 or 370, the user requests 382 to view bookmarks having geographical location parameters matching the determined geographical location information. The bookmarks may have been previously saved as favorite bookmarks by the user using application 337. In other examples discussed below, the bookmarks may be established via an autoscan function of application 337 that finds available broadcast stations for the geographical location. In response to the user's request, application 337 causes display 320 to list 384 bookmarks 334 according to the current geographical location information. The bookmarks may also be displayed using other parameters combined with their location parameter, such as a desired music genre. Using keypad 324, the user selects 386 a desired bookmark from the bookmarks displayed. Upon selection of the desired bookmark 336, application 337 fetches 390 the frequency and geographical location parameter for bookmark 336 from database 335.

After fetching the frequency for bookmark 336, application 337 instructs 391 tuner 328 to tune to the frequency for bookmark 336 and thereby receive 392 the audio broadcast. Application 337 may also be configured to find 393 and display 394 a graphic 339 on display 320 in conjunction with the reception of the audio broadcast. The graphic may be a standard radio indicator common to all stations that indicates to the user the audio broadcast is being played. As such, the user does not view a blank screen and is able see an indicator of audio broadcast reception. Preferably, however, the graphic 339 includes a logo image or animation (not shown) stored in memory 332 that is associated with bookmark 336. Further, the graphic 339 may form part of the associated bookmark displayed on display 320.

Graphic 339 provides various advantages. For example, it may indicate that interactive digital content is available for the broadcast station. It may further provide an appealing indication of the broadcast station that is readily recognizable by the user. It may also provide information about the broadcast station or advertise products or services. In other embodiments, the graphic 339 may be customizable, such as one of many downloadable graphics that may be obtained from a website for the broadcast station. Graphic 339 may include animations, sounds, video clips and other content.

In other embodiments, the graphic could initially be a standard radio indicator that is replaced by a logo image or animation (not shown) received subsequently from broadcast station server 118 when digital connectivity is established. The graphic, as well as website address and other bookmark information, could be obtained from station id server 113 according to methods discussed above in conjunction with FIG. 4. After receiving such information for the bookmark, application 337 preferably stores such bookmark information in database 335. According to one embodiment of the invention, such bookmark information could be updated periodically from the station id server 113 for all bookmarks stored in database 335 in accordance with programming of application 337.

In another embodiment of the invention, the user may manually request that bookmark information for bookmarks stored in database 335 be updated from station id server 113. In order to accurately identify the stations associated with each bookmark during such updates, frequency and geographical location parameter information are transmitted to station id server 113. The station may also be accurately identified to station id server 113 by transmitting station identification information to server 113 that is stored in database 335. The station identification information may have been received from an RDS signal along with the station broadcast or through communications with the broadcast station server for the station. In an alternate embodiment of the invention, an appropriate website address and graphic may be received while tuned to the broadcast frequency via an RDS signal. In a further embodiment, the delivery and display of graphical station identifiers may be implemented with messaging, such as multimedia messaging service (MMS) messages. Accordingly, when DTE 310 is tuned to a certain radio station, the existence of a corresponding graphical representation of the radio station may searched for in database 335. If not found, a MMS message including graphics and/or a jingle audio file is requested from the service using a short messaging service (SMS) message. When received, the MMS message is used to construct the graphical and/or audio representation of the radio station.

In any event, a graphic 339 is preferably displayed 394 on display 320 to indicate reception of the desired broadcast media. Substantially in parallel with tuning tuner 328, application 337 requests 395 communication with broadcast station server 118 using the website address for the server. In response, communication hardware 332 requests 396 data from broadcast station server 118. Accordingly, DTE 310 receives 398 data via communication hardware 332 and displays 399 the associated content on display 320.

Thus, according to method 378, the user is initially presented with bookmarks for his current geographical location, or optionally a selected geographical location. Once he selects a bookmark, he is able to view a graphic 339 indicating reception of broadcast media, such as audio radio media. When data from broadcast station server 213 is received, DTE 310 shows current data, such as interactive data, for the broadcast station's website. In other embodiments of the invention, the graphic 339, website data, and other bookmark information may be received via RDS signals.

Often, bookmarks are associated with a known broadcast station, such as a favorite radio station. In many cases, however, the user may like to review bookmarks for broadcast stations that are unknown to the user, but available in his geographical location. As such, the user may desire to scroll through bookmarks for available stations in his geographical location. Such scrolling may be improved by representing the bookmark for each available station with graphical information about the station that may identify whether the associated station includes digital interactivity. Accordingly, application 337 according to an embodiment of the invention includes an autoscan feature. The autoscan feature permits the user to view graphical information about the available broadcasts while tuning to desired broadcasts. Information gained from an autoscan process can be used to establish a set of bookmarks for the geographical location.

Figure 16:
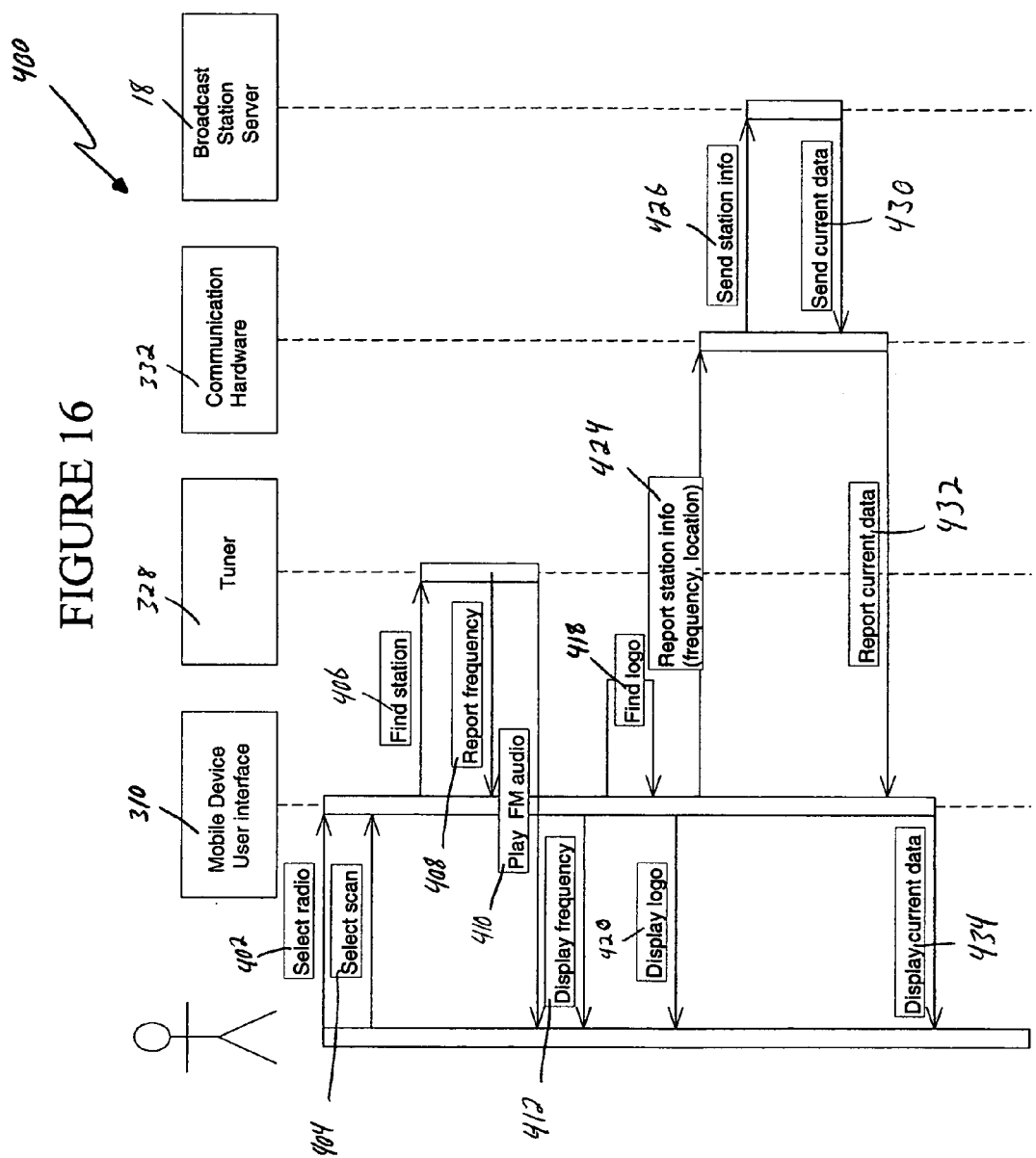
FIG. 16 shows a method for scanning for broadcast stations on a mobile device according to an embodiment of the invention.
Figure 17:
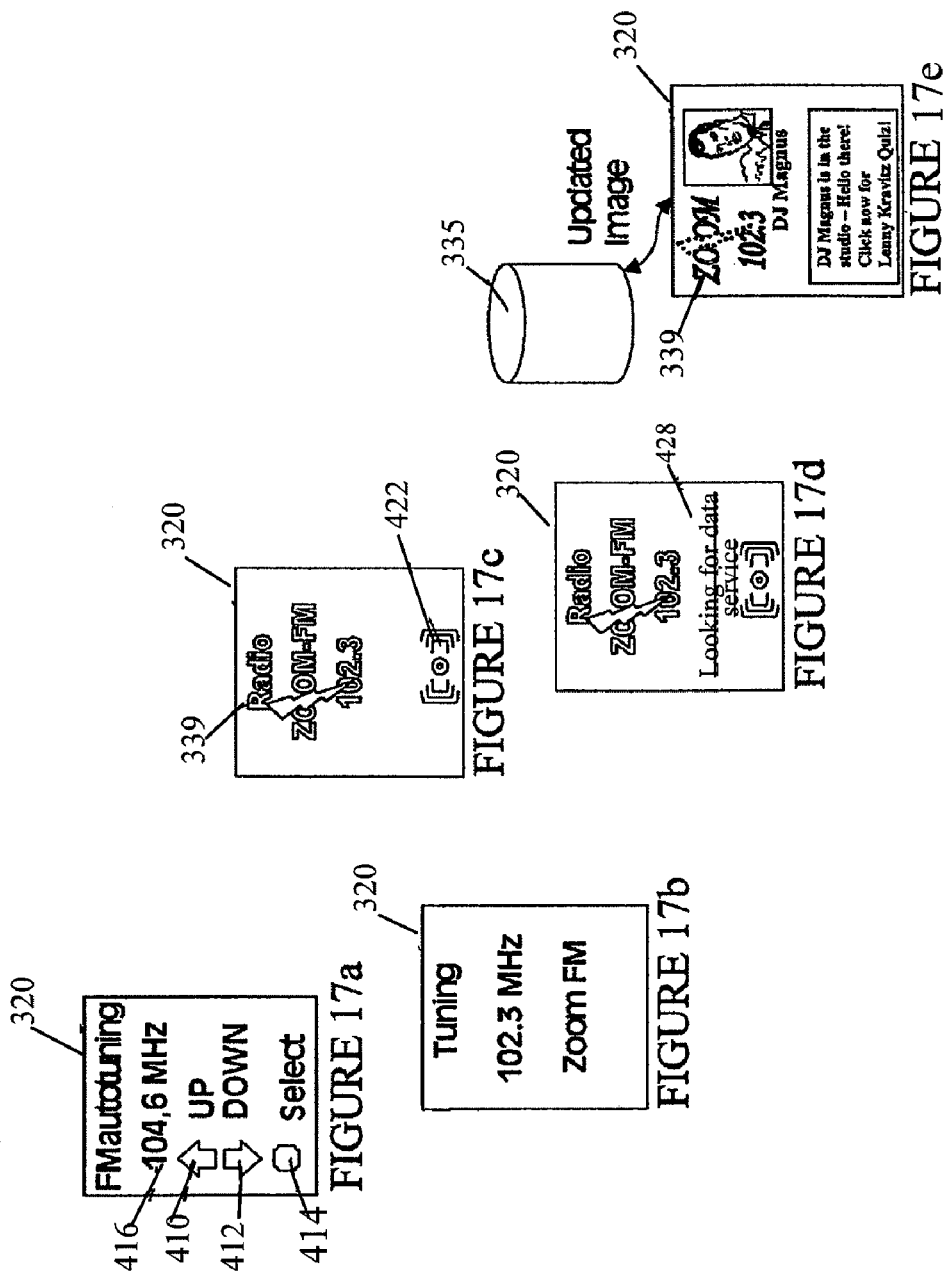
FIGS. 17a-17e show various displays on a mobile device for steps of the method of FIG. 16.

Referring now to FIGS. 16-17e along with FIG. 9, a method 400 is shown according to embodiments of the invention for scanning for available media broadcasts in a geographical area, tuning the mobile device by visually reviewing scanned broadcast stations, and for optionally creating bookmarks from the available broadcast stations. As shown, the method begins as the user of DTE 310 selects 402 an option for listening to the radio. Such selection may occur via the user entering a shortcut key on keypad 324 to application 337, or via other user interface methods. After execution of application 337, the user may select 404 a "Scan" feature of application 337, which causes tuner 328 to scan the appropriate frequency bandwidth to find 406 available station broadcasts. When one or more broadcast frequencies are found, tuner 328 reports 408 such frequencies to application 337.

As shown in FIG. 17a, application 337 may indicate on display 320 that DTE 310 is in the process of autotuning. The user may also be presented with options to control the autotuning operation. For example, UP 410, DOWN 412 and SELECT 414 options may be shown on display 310 along with the current frequency 416 located by tuner 328. If the user selects the UP 410 or DOWN 412 options, application 337 instructs tuner 328 to scan above or below the current frequency respectively. If the user chooses the SELECT 414 option, or optionally in response to expiration of a time out period in which DTE 310 waits for user input, tuner 328 tunes to the current frequency displayed and begins playing 410 the audio broadcast received. As shown in FIG. 17b, display 310 may display 412 to the user the frequency to which DTE 310 is tuning.

Upon selection of a scanned frequency, application 337 attempts to find 418 a graphic 339 for broadcast station. Application 337 first searches bookmark database 335 to determine whether a bookmark is stored locally for the station. For example, based on the current geographical location information and the scanned frequency, application 337 may be able to locate a bookmark with associated bookmark information for the scanned broadcast station. As shown in FIG. 17c, if a bookmark is found and a graphic 339 is stored in database 335 for the bookmark, the stored graphic 339 is initially displayed 420 on display 320. Along with the graphic 339, a broadcast reception indicator 422 is optionally displayed to indicate to the user that the broadcast is being received. In other embodiments, the graphic 339, as well as website data and other bookmark information, may be received via RDS signals or data messages, such as cell broadcast messages. In a further embodiment, the graphic 339 may be requested from a server, such as station id server 113. In yet further embodiments, SMS and/or MMS messages may be used to request and receive graphic 339 and/or audio files.

Application 337 further checks for data service, such as a website, for the station associated with the current scanned broadcast. If the broadcast signal includes a station identity as part of an RDS signal, the station identity information is used to request data connectivity information. If not, frequency and geographical location information are used to request data connectivity information. Using such information, application 337 instructs 424 communication hardware 332 to send 426 frequency and geographical location information to station id server 113 and request reception of data from the website associated with the broadcast station according to the methods discussed along with FIGS. 1-8. As shown in FIG. 17d, while searching for data service, display 320 optionally displays a data search indicator 428 to indicate that DTE 310 is searching for data service.

If data service for the current scanned station is received 430 by communication hardware 332, the information is processed 432 and the digital content is displayed 434 on display 320. FIG. 17e illustrates the enhanced display shown upon reception of data service for the scanned broadcast station. As shown, an updated graphic 339 may be received as well as data connectivity information, such as the website for the broadcast station server 118. This information is preferably automatically stored in database 335, and if a bookmark does not exist for the station, one is created. The bookmark preferably includes as much information as available, such as genre, graphic 339, website information, geographical location, frequency, etc. The user may also be provided with the option of saving the broadcast station as a favorite bookmark. Further, application 337 can optionally be setup to save all stations located from the autoscan process as bookmarks for the geographical location.

As an example to illustrate the previous method, suppose the user travels to a different location that he visited a year ago. Suppose that he desires to scan available broadcast stations. As shown in FIG. 17a, suppose that as a programmed preference, application 337 starts at the high end of the frequency range and works down. Suppose that DTE 310 locates frequency 104.6 as an available broadcast. Upon listening briefly to 104.6, suppose also that the user decides to try another station. As such, the user may select the down option displayed on display 320. Suppose that the user does so, and that tuner 328 subsequently locates frequency 102.3 as a viable broadcast having a sufficiently strong signal. If the user does nothing, DTE 310 times out and begins to tune to broadcast 102.3. Further, application 337 finds an old bookmark in database 335 for the current frequency at the present geographical location, as determined by one of methods 350, 356, 362 and 370. Based on the data for the old bookmark, as illustrated in FIG. 17e, DTE 310 displays the stored graphic 339 and attempts to connect to the website address stored in database 335. Upon successful reception of data from the station website, the related content is displayed in display 320, as shown in FIG. 17d along with a new graphic 339. Further, the old bookmark is updated for future reference by the user.

In an alternative embodiment (not shown), DTE 310 may request information for all available broadcasts in the current geographical area from a server, such as station id server. Upon reception of such information, DTE 310 establishes bookmarks to all available broadcasts, preferably including graphics 339. As such, the user may easily scroll through graphical bookmarks for available broadcasts in the geographical area.

In many of the embodiments discussed above, RDS transmissions may be used to provide information and other information that supplements a particular station broadcast to a mobile device bookmark. As is known in the art, RDS transmissions often include alternative frequencies (AF) on which a particular program or station broadcast is being transmitted. Further, RDS transmissions often include program identity (PI) information, which identifies a current program being broadcast via the transmission (e.g. the name of a talk show), and program station (PS) information, which identifies the broadcast station (e.g. Zoom FM). Other information, such as geographical location information, may also be transmitted via RDS. Based on RDS information transmitted, radio receivers can be programmed to be very user-friendly. For example, the radio receivers may quickly tune to an AF for a PI being received as the signal weakens and a stronger signal becomes available. Such radio receivers, however, require an RDS demodulator/decoder and a microprocessor (not shown) in order to receive such transmissions, which may not be available on many mobile devices that are able to receive digital communications.

Figure 18:
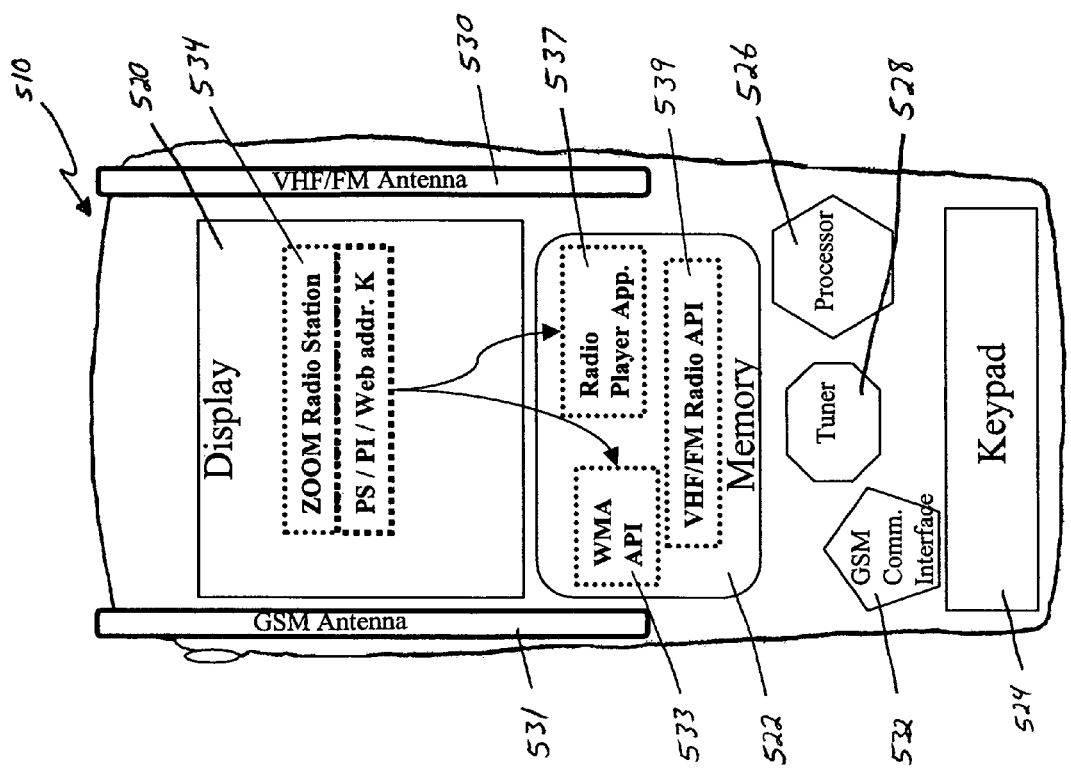
FIG. 18 shows a functional block diagram of a mobile device according to a further embodiment of the invention.

The benefits of RDS transmissions on a non-RDS capable mobile device may be realized through the use of digital communications that provide information otherwise provided in RDS transmissions, such as through cell broadcast service (CBS) transmissions. Referring now to FIGS. 18-21, systems and methods are shown for providing supplemental broadcast information over a digital communications network according to embodiments of the invention. FIG. 18 shows a DTE 510 that is adapted to receive analog broadcast transmissions via VHF/FM antenna 530 and digital communications from a data communication network, such as for example, a Global System for Mobile Communications (GSM) network via GSM antenna 531. It should be noted that the present invention is not limited to receiving GSM data via the GSM antenna 531, also other types of antenna arrangements are possible. Except for aspects related to CBS transmissions, aspects and preferences for DTE 510 are generally the same as DTE 310.

According to one embodiment, software may be used to tune and/or retune VHF/FM receiver 530 according to RDS information received in CBS transmissions. As such, a VHF/FM Radio application programming interface (API) 539, a wireless message API (WMA) 533, and a radio player application 537, which may be implemented as an application that runs in a JAVA 2 Micro Edition (J2ME) environment, are stored in memory 522 of DTE 510. During operation, if GSM antenna 531 is tuned to receive CBS transmissions that are delivering RDS information, a received CBS message 600 (shown in FIG. 21) is submitted to radio player application 537 via WMA 533. The radio player application 537 is able to decode the RDS information and, based on the information, select the appropriate frequency. Using the VHF/FM Radio API 539, the radio player application 537 tunes tuner 528, which is preferably a digital phase-locked loop (PLL) synthesizer, to receive desired broadcast transmissions. Thus, based on the RDS information, as well as other inputs such as user commands, application 537 provides instructions to processor 526 for controlling DTE 510 with regard to playing and displaying broadcast media and content.

Figure 21:
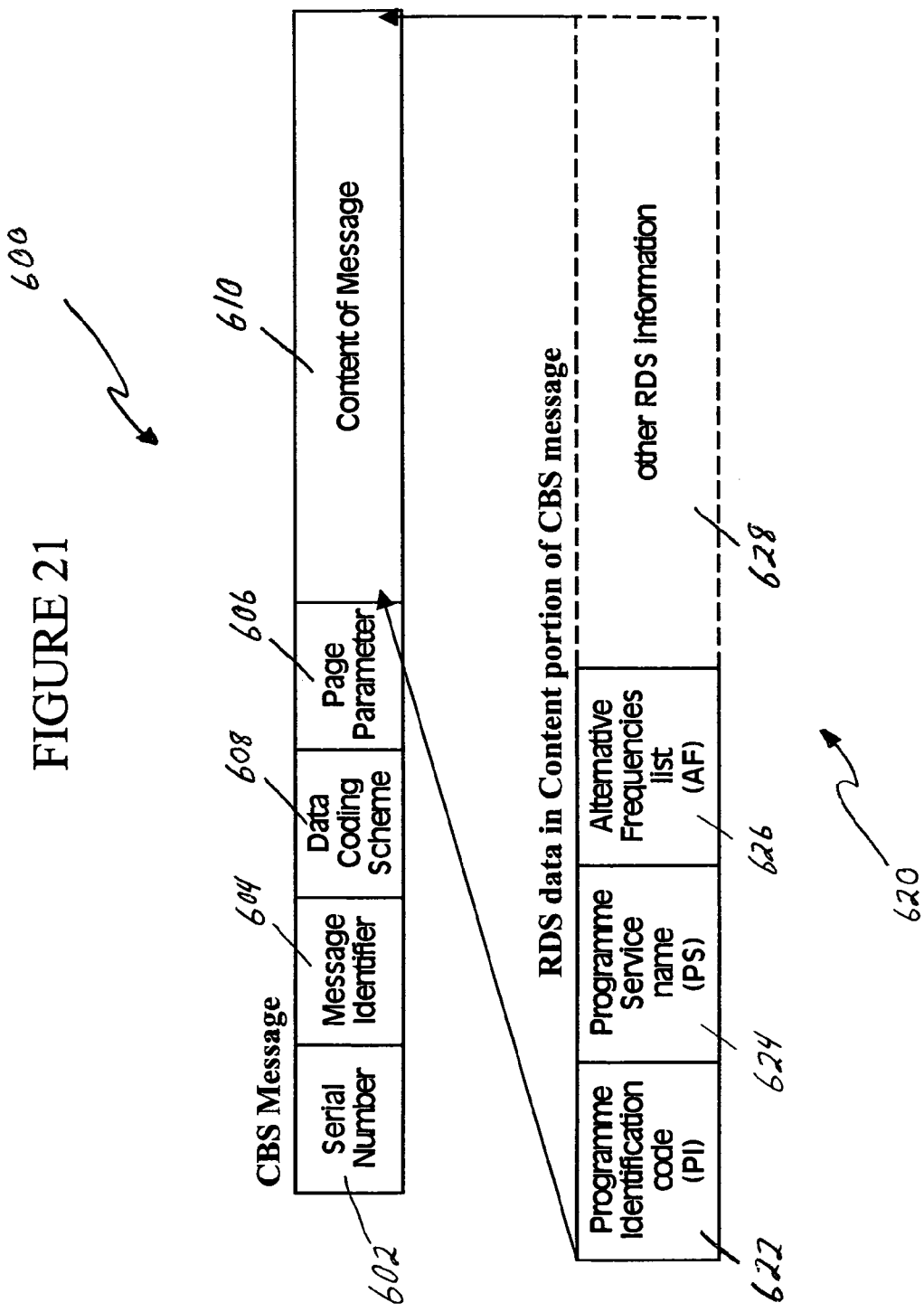
FIG. 21 shows message formats for messages broadcast in the mobile network of FIG. 20 according to an embodiment of the present invention.

FIG. 21 shows a typical single page CBS message 600, which typically consists of 88 octets. Each CBS message may consist of 1 to 15 pages. CBS messages 600 are a type of broadcast message sent to all receivers in a particular geographical area that are not acknowledged by the receivers. Each CBS message page includes a serial number 602, a message identifier 604, a page number 606, a data-coding scheme 608, and message content 610. Message identifier 604 indicates the source of the message and serial number 602 is a unique identifier for a particular message. Page parameter 606 indicates the total number of pages (messages) within the CBS message 600 and the current number within the message sequence. Data coding scheme 608 provides coding information about the message content, such as language or format.

RDS messages according to an embodiment of the invention are each carried in the content 610 of a CBS message. For example, RDS message 620 shown in FIG. 21 is carried in CBS message 600. RDS message 620 includes PI 622, PS 624, AF 626 and other information 628, such as location information for a broadcast cell over which the RDS/CBS message is sent or data for a bookmark graphic. By carrying an RDS message in a CBS message, the benefits of RDS technology may be gained by a mobile device that can receive CBS messages over a communication network, and that can receive broadcast media.

Figure 19:
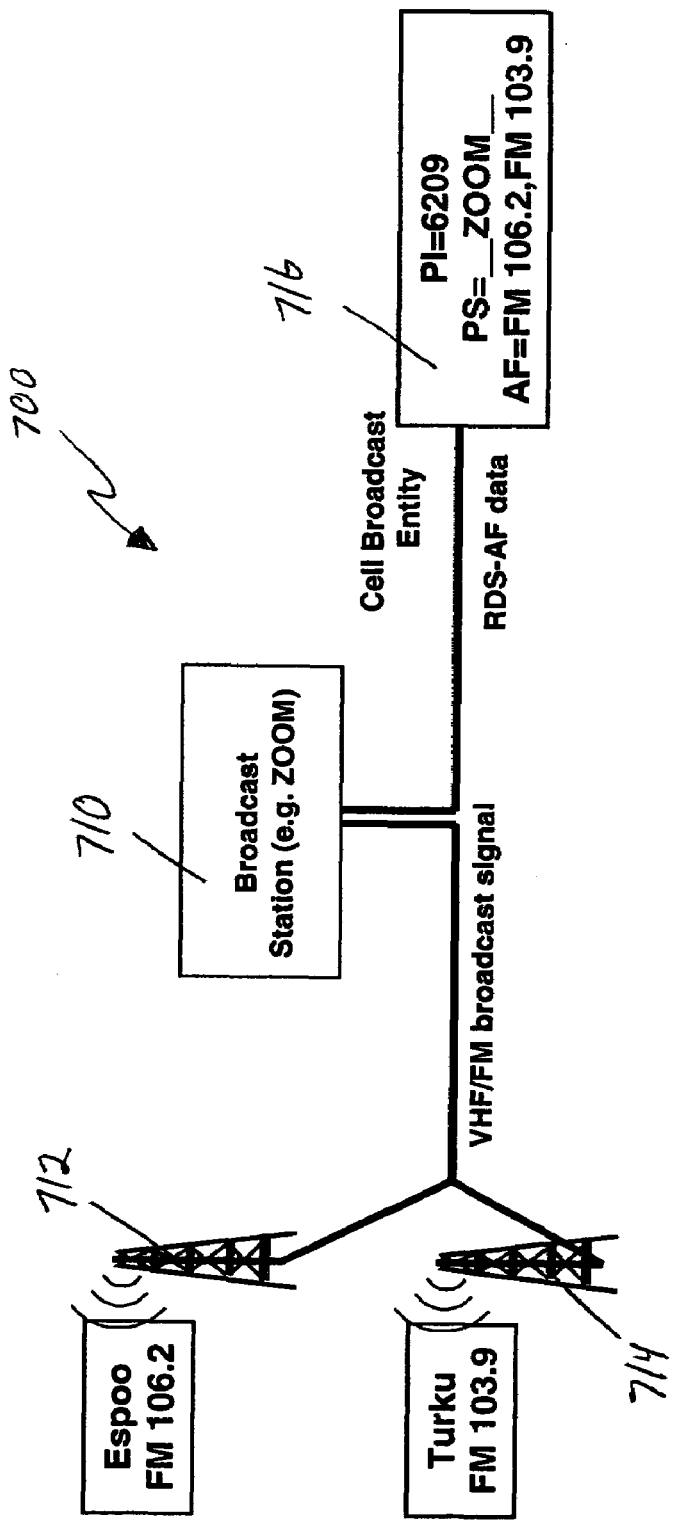
FIG. 19 shows a broadcast system for use with the mobile device of FIG. 18 according to an embodiment of the present invention.

Referring to FIG. 19, a sample broadcast network 700 is shown to illustrate advantages of CBS messages in supplementing broadcast transmissions. Suppose that broadcast station 710 broadcasts FM radio under the station name "ZOOM FM." The broadcast signal from station 710 is sent via wires, or alternatively wirelessly using a wireless radio link, to a first transmitter 712 located in Espoo, Finland and a second transmitter 714 located in Turku, Finland. First transmitter 712 transmits the broadcast station ZOOM FM at a frequency of 106.2 MHz to the geographical area around the city of Espoo, and second transmitter 714 transmits the same broadcast station at a frequency of 103.9 MHz to the geographical area around Turku. RDS information is transmitted by transmitter 712, 714 along with the broadcast, which includes AF, PI and PS data. Broadcast station 710 sends the same RDS information to a cell broadcast entity (CBE) 716 that services the geographical locations of Espoo, Turku, and regions in between.

Figure 20:
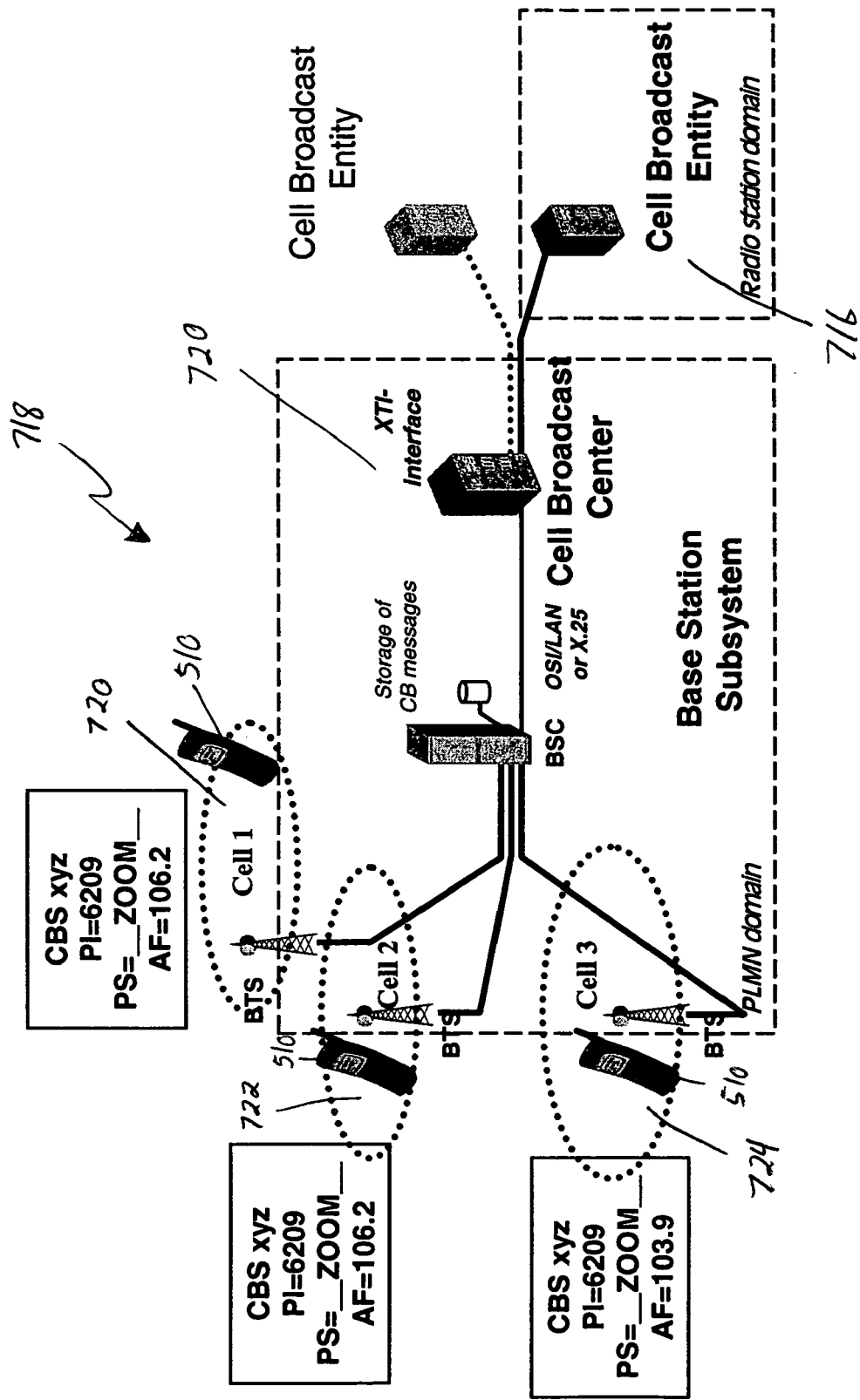
FIG. 20 shows a mobile network for use with the mobile device of FIG. 18 and the broadcast system of FIG. 19 according to an embodiment of the present invention.

Referring now to FIG. 20 in conjunction with FIG. 19, a public land mobile network (PLMN) 718 is shown that covers the domain of radio station ZOOM FM. PLMN 718 provides GSM mobile communications to mobile devices within its domain, which includes cell 1 720, cell 2 722, and cell 3 724 within the broadcast domain of radio station ZOOM FM. As shown, cell 1 720 and cell 2 722 receive FM radio broadcasts for ZOOM FM that are transmitted by radio broadcast transmitter 712, and cell 3 receives ZOOM FM broadcasts from transmitter 714. Based on an agreement between broadcast station 710 and PLMN 718, RDS information is periodically transmitted in cell broadcast areas that coincide with the broadcast transmission areas through CBS messages. The CBS messages may originate from a number of cell broadcast entities (CBEs), including CBE 716, which are connected to a cell broadcast center (CBC) 720. CBS messages from particular CBEs are transmitted according to CBCs cell coverage requirements as agreed to with broadcast station ZOOM FM.

The CBC sends CBS messages to appropriate base station controllers (BSC), where the messages are stored and periodically transmitted according to instructions from CBC 720. DTE 510 can be configured to receive these CBS messages manually by the user. Also, DTE 510 may be programmed to permit PLMN 718 to configure DTE 510 over the air (OTA) to receive CBS messages. CBS messages for each radio station are preferably transmitted over a dedicated channel; however, PLMN 718 could send all CBS messages for the domain over a common CB channel.

Suppose as an example that a user selects a bookmark 534 on DTE 510 for Zoom broadcast station 710 while in the city of Espoo. According to its programming, application 537 instructs tuner 528 to tune to frequency 106.2 MHz. Further, based on the reception of CBS message 600, which includes updated web address information as part of the encapsulated RDS message 620, DTE 510 requests digital content from broadcast station server 18 at the updated web address. Suppose that the RDS message 620 further provides AF information, which indicates that the same PS 624 is broadcasting the same PI on frequency 103.9 for cell 3. Suppose also that the RDS message 620 includes geographical location information in the "other" portion 628 of the RDS message. As such, upon entering cell 3 724 in the area of the city of Turku, application 537 automatically causes tuner 528 to tune the AF of 103.9. The frequency change is transparent to the user. Thus, without providing additional RDS functionality to DTE 510, DTE 510 is able to update its bookmark for ZOOM FM and to automatically change frequencies as needed.

While the present invention has been described in connection with the illustrated embodiments, it will appreciated and understood that modifications may be made without departing from the true spirit and scope of the invention. In particular, the invention applies to any computing device adapted to receive radio broadcasts and having data connectivity. Further, the radio broadcasts are not limited to FM radio, and may include analog or digital broadcasts.

We claim:

1. A method comprising:
   receiving at a device a message comprising combined functionality bookmark information, the combined functionality bookmark information comprising identifiers for accessing a broadcast media and an associated website;
   storing the combined functionality bookmark information in a memory of the device;
   in response to receiving a user selection of a bookmark associated with the bookmark information, performing substantially simultaneously:
      setting a receiver on the device to receive the broadcast media from a broadcast media station according to the bookmark information associated with the bookmark; and
      opening on the device an interactive data communication channel for interacting with the broadcast media station according to the bookmark information associated with the bookmark.

2. The method of claim 1, wherein the message comprises a RDS message encapsulated within a cell broadcast service (CBS) message.

3. The method of claim 1, wherein the broadcast media comprises data broadcast via a digital radio transmission.

4. A method comprising:
   storing at a device a message comprising combined functionality bookmark information, the combined functionality bookmark information comprising an identifier for accessing a broadcast media, an identifier for accessing an associated website, and a geographical location parameter matching a determined geographical location for the device;
   in response to receiving a user selection of a bookmark associated with the bookmark information, performing substantially simultaneously:
      setting a receiver on the device to receive the broadcast media from a broadcast media station according to the bookmark information associated with the bookmark; and
      opening on the device an interactive data communication channel for interacting with the broadcast media station according to the bookmark information associated with the bookmark.

5. The method of claim 4, wherein the geographical location is determined by receiving the geographical location information from a user interface on the device.

6. The method of claim 4, wherein the geographical location is received from a wireless cellular network in communication with the device.

7. The method of claim 4, wherein the geographical location is determined from data transmitted within a FM transmission of the broadcast media.

8. The method of claim 7, wherein the data transmitted comprises a radio data system (RDS) message.

9. The method of claim 4, wherein the geographical location is determined from the message transmitted to the device via a communication network.

10. The method of claim 9, wherein the message comprises a cellular network control message.

11. The method of claim 4, wherein the geographical location is determined from a global positioning system (GPS) signal received by the device.

12. The method of claim 4, further comprising displaying a graphic associated with the broadcast media station as part of the bookmark.

13. A method comprising:
   searching for available broadcast media transmissions;
   detecting an available broadcast media transmission;
   creating a bookmark comprising combined functionality bookmark information, the combined functionality bookmark information comprising identifiers for accessing the available broadcast media transmission and an associated website;
   in response to receiving a user selection of the bookmark associated with the bookmark information, performing substantially simultaneously:
      setting a receiver on a device to receive the available broadcast media transmission according to the bookmark information associated with the bookmark;
      displaying on the device a graphic indicating that the receiver is being set to receive the available broadcast media transmission; and
      opening on the device an interactive data communication channel for receiving data for interactive content from a server associated with the broadcast media transmission according to the bookmark information associated with the bookmark.

14. The method of claim 13, wherein for displaying a graphic, the graphic comprises a logo for a broadcast media station associated with the available broadcast media transmission.

15. The method of claim 13, wherein displaying a graphic includes displaying the interactive content received from the server associated with the broadcast media transmission.

16. A device comprising:
   a display;
   a communication interface;
   a receiver;
   a storage medium; and
   a processor coupled to the storage medium for performing:
      receiving a message comprising combined functionality bookmark information, the combined functionality bookmark information comprising identifiers for accessing a broadcast media and an associated website;
      storing the combined functionality bookmark information in the storage medium;
      in response to receiving a user selection of a bookmark associated with the bookmark information, performing substantially simultaneously:
         setting the receiver to receive broadcast media from a broadcast media station according to the bookmark information associated with the bookmark; and
         opening an interactive data communication channel for interacting with the broadcast media station according to the bookmark information associated with the bookmark.

17. The device of claim 16, wherein for the receiving a message, the message comprises a RDS message encapsulated within a cell broadcast service (CBS) message.

18. A device comprising:
   a display;
   a communication interface;
   a user interface;
   a storage medium; and
   a processor coupled to the storage medium configured to perform:
      storing a message comprising combined functionality bookmark information, the combined functionality bookmark information comprising an identifier for accessing a broadcast media, an identifier for accessing an associated website, and a geographical location parameter matching a determined geographical location for the device;

in response to receiving a user selection of a bookmark associated with the bookmark information, performing substantially simultaneously:

setting up the device to receive broadcast media from a broadcast media station according to the bookmark information associated with the bookmark; and opening an interactive data communication channel for interacting with the broadcast media station according to the bookmark information associated with the bookmark.

19. The device of claim 18, wherein the geographical location is determined by receiving the geographical location information from a user interface.

20. The device of claim 18, wherein the geographical location is received from a wireless cellular network in communication with the device.

21. The device of claim 18, wherein the geographical location is determined from data transmitted within a FM transmission of the broadcast media.

22. The device of claim 21, wherein the data transmitted comprises a RDS message.

23. The device of claim 21, wherein the geographical location is determined from the message transmitted to the device via a communication network.

24. The device of claim 23, wherein the message comprises a cellular network control message.

25. The device of claim 18, wherein the geographical location is determined from a GPS signal received by the device.

26. The device of claim 18, wherein the processor further performs displaying a graphic associated with the broadcast media station as part of the bookmark.

27. A device comprising:
a display;
a storage medium; and
a processor coupled to the storage medium configured to perform:
scanning for available broadcast media transmissions;
detecting an available broadcast media transmission;
creating a bookmark comprising combined functionality bookmark information, the combined functionality bookmark information comprising identifiers for accessing the available broadcast media transmission and an associated website;
in response to expiration of a timeout period for reception of a user selection of the bookmark:
setting up the device to receive the available broadcast media transmission according to the bookmark information associated with the bookmark;
displaying on the display a graphic representing the broadcast media transmission; and
opening an interactive data communication channel for receiving digital content associated with the broadcast media transmission according to the bookmark information associated with the bookmark.

28. The device of claim 27, wherein the processor performs the saving the bookmark for the broadcast media transmission into the storage medium.

29. A computer readable medium having computer-executable instructions for performing actions comprising:
storing at a device a message comprising combined functionality bookmark information, the combined functionality bookmark information comprising an identifier for accessing a broadcast media, an identifier for accessing an associated website, and a geographical location parameter matching a determined geographical location for the device;
in response to receiving a user selection of a bookmark associated with the bookmark information, performing substantially simultaneously:
setting a receiver on the device to receive the broadcast media from a broadcast media station according to the bookmark information associated with the bookmark; and
opening on the device an interactive data communication channel for interacting with the broadcast media station according to the bookmark information associated with the bookmark.

30. A computer readable medium having computer-executable instructions for performing actions comprising:
searching for available broadcast media transmissions;
detecting an available broadcast media transmission;
creating a bookmark comprising combined functionality bookmark information, the combined functionality bookmark information comprising identifiers for accessing the available broadcast media transmission and an associated website;
upon receiving a user selection of the bookmark associated with the bookmark information, performing substantially simultaneously:
setting a receiver on a device to receive the available broadcast media transmission according to the bookmark information associated with the bookmark;
displaying on the device a graphic according to the bookmark information associated with the bookmark, indicating that the receiver is being set to receive the available broadcast media transmission corresponding to the selected bookmark; and
receiving data at the device for interactive content from a server associated with the available broadcast media transmission according to the bookmark information associated with the bookmark.

31. The computer readable medium of claim 30, wherein the computer-executable instructions further perform the action of saving the bookmark for the broadcast media transmission in memory on the device.

32. A computer readable medium having computer-executable instructions for performing actions comprising:
receiving at a device a message comprising combined functionality bookmark information, the combined functionality bookmark information comprising identifiers for accessing a broadcast media and an associated website;
storing the combined functionality bookmark information in a memory of the device;
in response to receiving a user selection of a bookmark, performing substantially simultaneously:
setting a receiver on the device to receive the broadcast media from a broadcast media station according to the bookmark information associated with the bookmark; and
opening on the device an interactive data communication channel for interacting with the broadcast media station according to the bookmark information associated with the bookmark.

33. A method comprising:
receiving on a device a user selection of a combined functionality bookmark, wherein the bookmark comprises information for receiving broadcast media and website information for receiving broadcast content from a broadcast media station; and in response to receiving the user selection, setting a receiver on the device to receive the broadcast media from the broadcast media station according to the bookmark, and opening on the device an interactive data communication channel associated with the broadcast media station, wherein, for setting and opening, the bookmark provides both a network address for the interactive data communication channel and information for setting the receiver to receive the broadcast media.

34. A method comprising:

displaying on a device a combined functionality bookmark associated with broadcast media, the combined functionality bookmark, when selected, providing for reception of the broadcast media from a broadcast media station and two-way, interactive data communication with the broadcast media station;

in response to receiving at the device a user selection of the combined functionality bookmark, performing:

sending from the device a request to a station id server for bookmark information associated with the broadcast media station, the bookmark information including information for receiving a broadcast from the broadcast media station and for opening an interactive data communication channel with the broadcast media station;

receiving at the device a message containing the bookmark information;

setting a receiver on the device to receive the broadcast media from the broadcast media station according to the bookmark information; and substantially simultaneously with setting the receiver to receive the broadcast media, opening on the device an interactive data communication channel according to the bookmark information.

* * * * *

UNITED STATES PATENT AND TRADEMARK OFFICE
CERTIFICATE OF CORRECTION

| | | |
|---|---|---|
| PATENT NO. | : 7,623,824 B2 | Page 1 of 1 |
| APPLICATION NO. | : 10/319475 | |
| DATED | : November 24, 2009 | |
| INVENTOR(S) | : Akseli Anttila et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 488 days.

Signed and Sealed this
Tenth Day of May, 2011

David J. Kappos
*Director of the United States Patent and Trademark Office*